(12) United States Patent
Brochu et al.

(10) Patent No.: US 10,465,388 B2
(45) Date of Patent: Nov. 5, 2019

(54) MULTI-LAYER GUTTER COVER AND GUTTER ASSEMBLY COMPRISING THE SAME

(71) Applicant: Stéphane Brochu, Saint-Romuald (CA)

(72) Inventors: Stéphane Brochu, Saint-Romuald (CA); David Bourdeau, Québec (CA)

( * ) Notice: Subject to any disclaimer, the term of this patent is extended or adjusted under 35 U.S.C. 154(b) by 0 days.

(21) Appl. No.: 16/121,964

(22) Filed: Sep. 5, 2018

(65) Prior Publication Data

US 2019/0071874 A1    Mar. 7, 2019

Related U.S. Application Data

(60) Provisional application No. 62/554,328, filed on Sep. 5, 2017.

(51) Int. Cl.
*E04D 13/076* (2006.01)
*H02K 21/02* (2006.01)

(52) U.S. Cl.
CPC ......... *E04D 13/076* (2013.01); *H02K 21/024* (2013.01); *H02K 21/026* (2013.01)

(58) Field of Classification Search
CPC .................................................. E04D 13/076
USPC ............................................................ 52/12
See application file for complete search history.

(56) References Cited

U.S. PATENT DOCUMENTS

| | | | | |
|---|---|---|---|---|
| 4,820,407 A * | 4/1989 | Lilie | ...................... | B01D 29/05 209/397 |
| 5,406,754 A * | 4/1995 | Cosby | ................... | E04D 13/076 52/12 |
| 6,598,352 B2 * | 7/2003 | Higginbotham | ...... | E04D 13/076 210/474 |
| 7,310,912 B2 * | 12/2007 | Lenney | ................. | E04D 13/076 210/162 |
| 7,913,458 B2 * | 3/2011 | Higginbotham | ...... | E04D 13/076 52/11 |
| 8,479,454 B2 * | 7/2013 | Lenney | ................. | E04D 13/076 248/48.1 |
| 8,635,811 B2 * | 1/2014 | Horton | .................. | E04D 13/076 52/11 |
| 9,010,030 B2 * | 4/2015 | Davis | .................... | E04D 13/076 52/11 |
| 9,127,463 B1 * | 9/2015 | Feldhaus | ............. | E04D 13/0725 |

* cited by examiner

*Primary Examiner* — Christine T Cajilig
(74) *Attorney, Agent, or Firm* — Remenick PLLC

(57) ABSTRACT

A gutter assembly comprising a gutter cover and a gutter cover for covering an opening of a gutter having a front wall, a rear wall and a bottom wall defining a gutter channel, the gutter cover comprising: a front portion operatively engageable with the front wall of the gutter; a rear portion operatively engageable with the rear wall of the gutter; a central portion extending between the front portion and the rear portion and having a first panel and a second panel, the first panel extending above and spaced apart from the second panel, the first panel having a first set of throughholes and the second panel having a second set of throughholes being at least partially offset from the first set of throughholes.

21 Claims, 23 Drawing Sheets

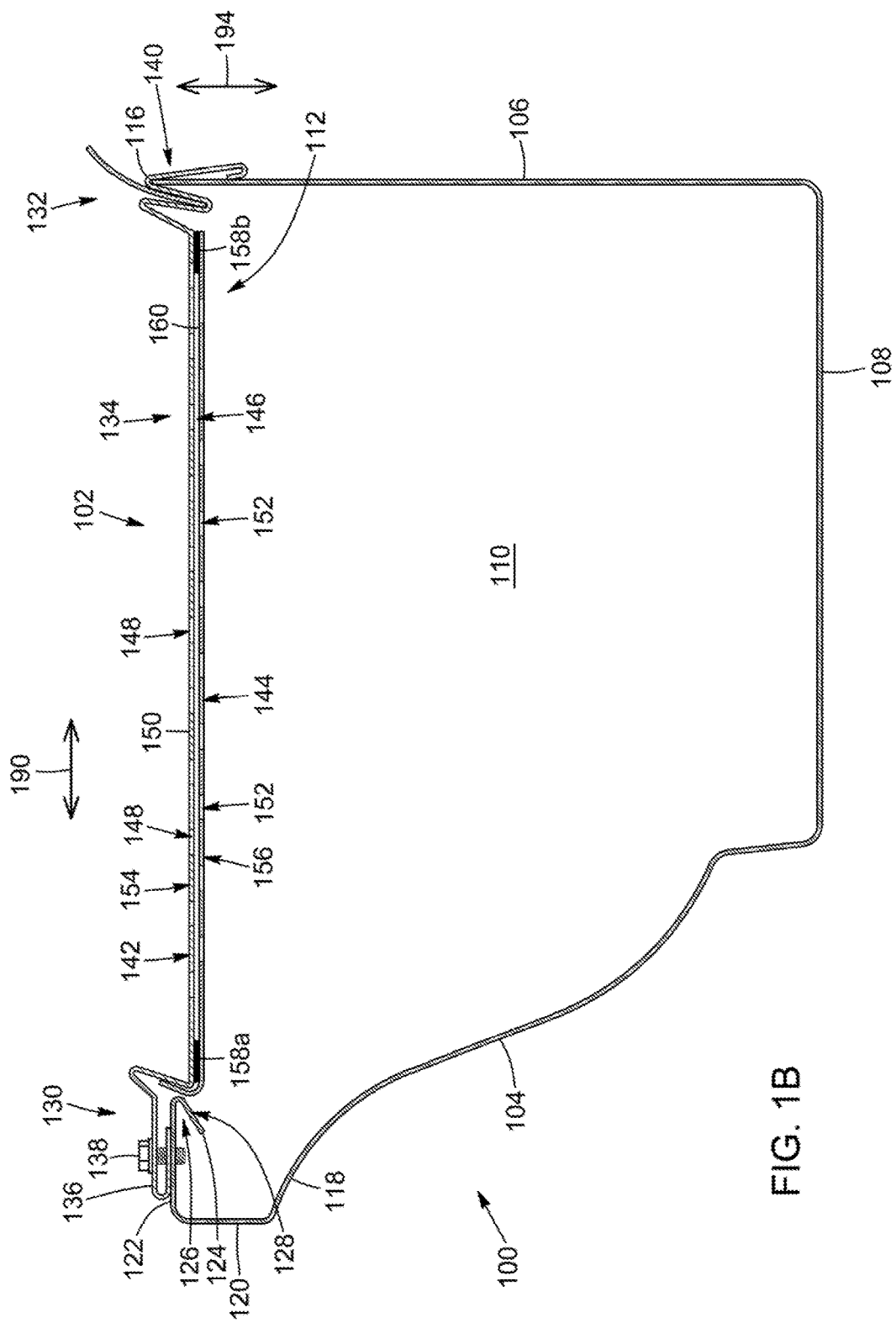

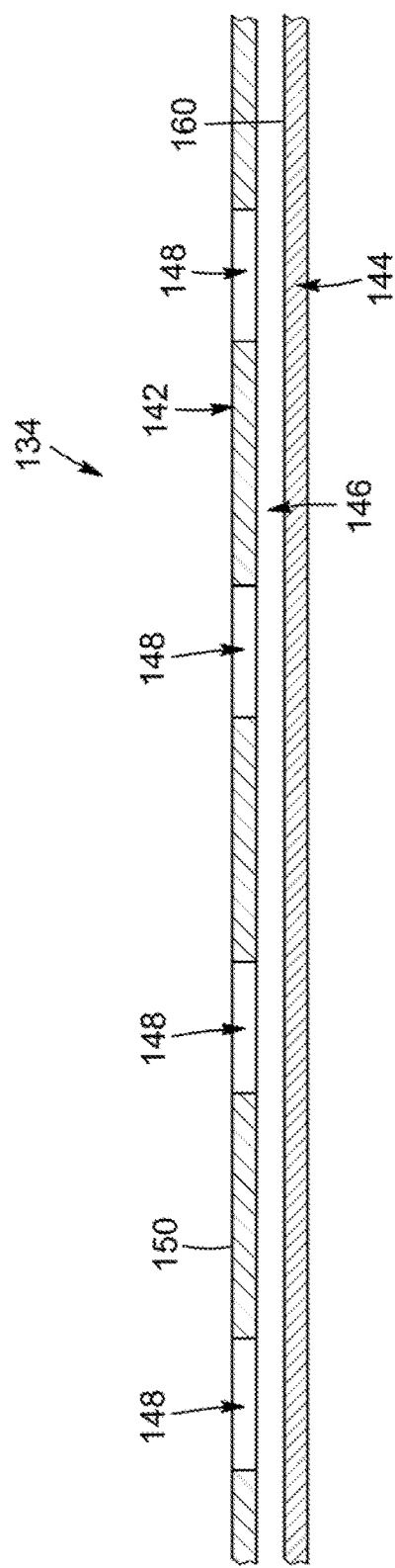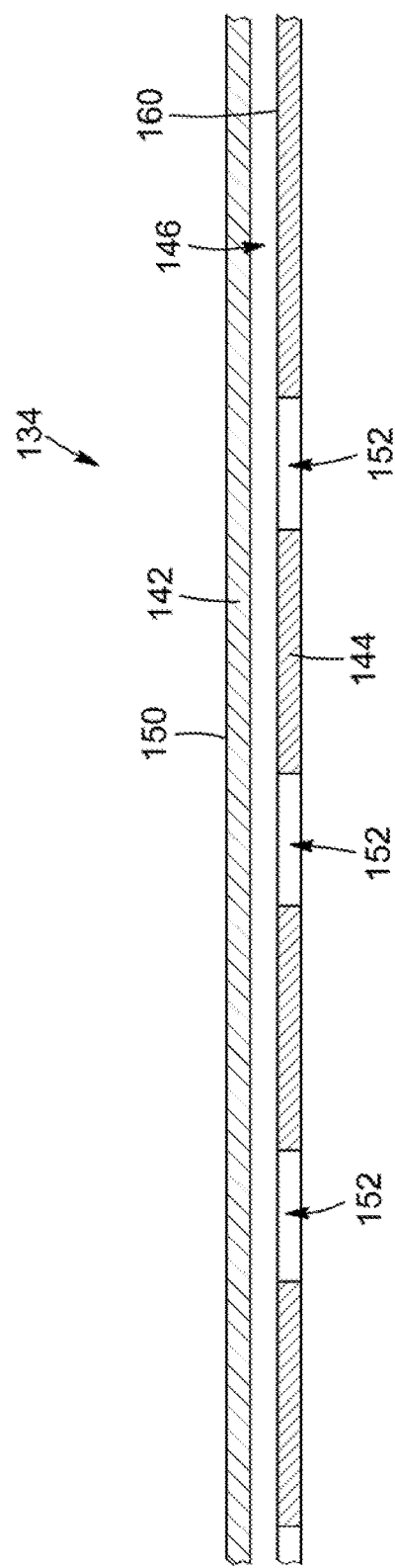

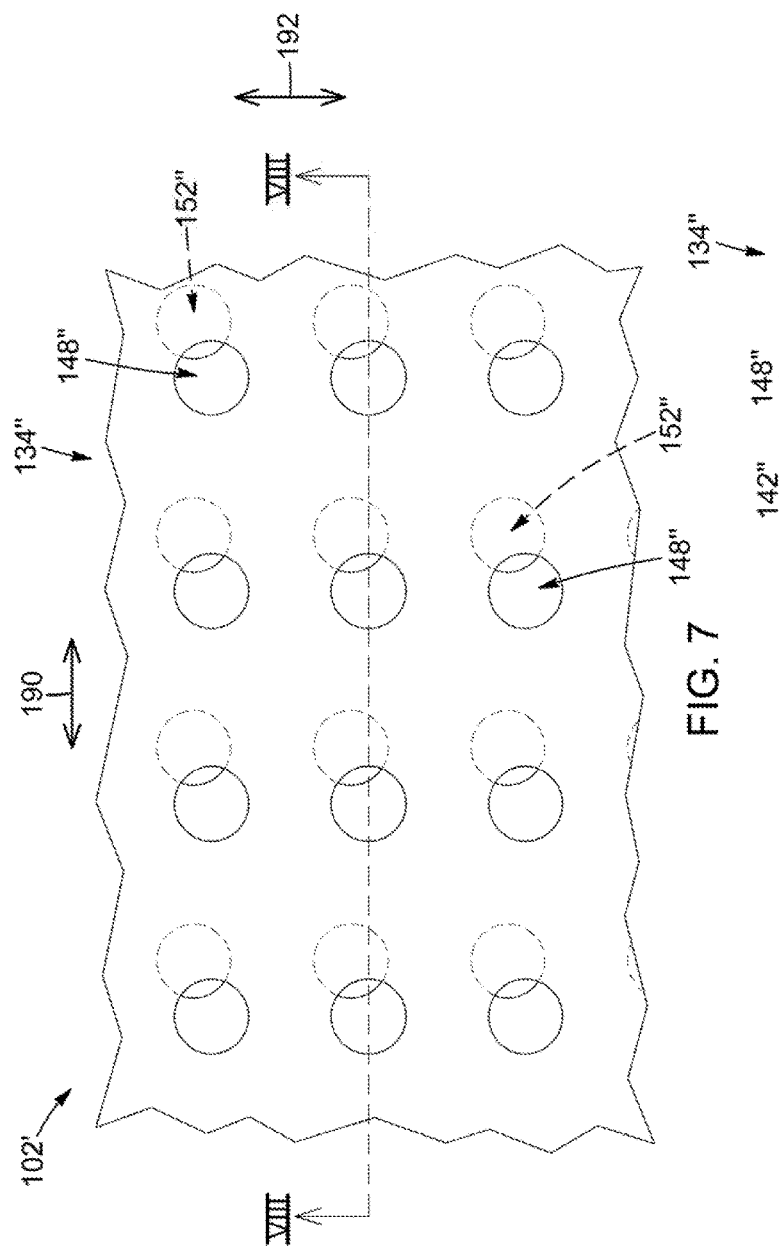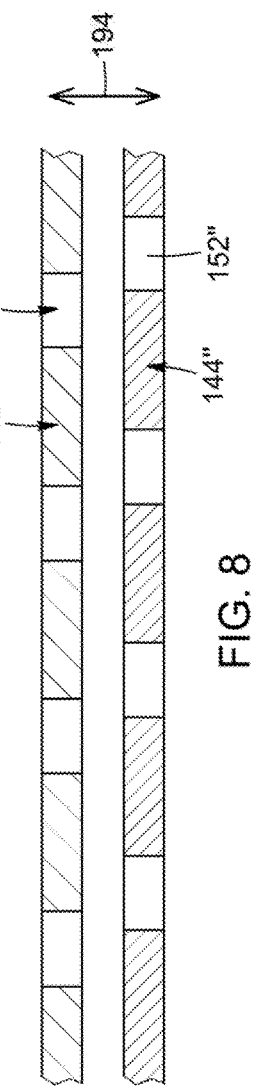

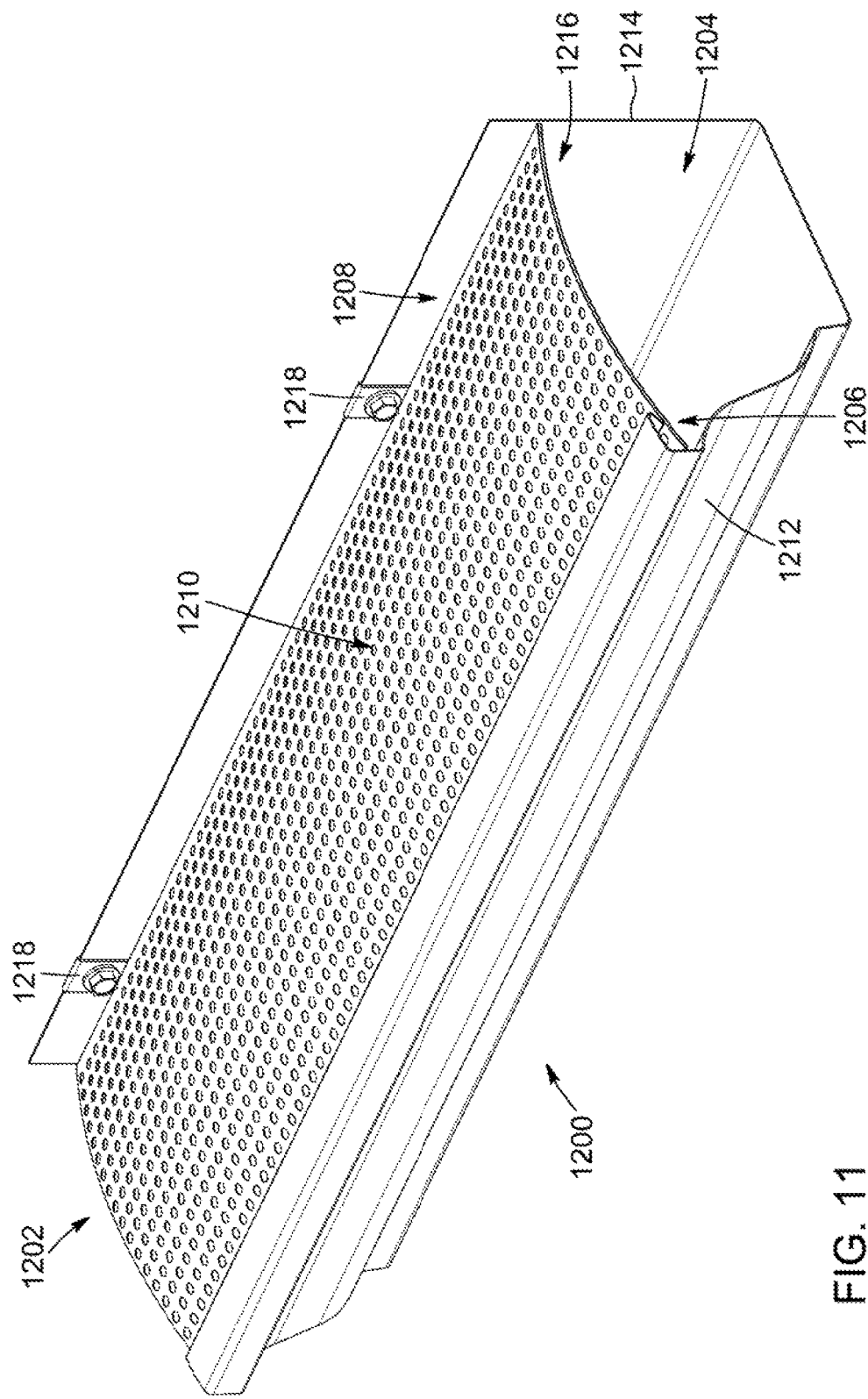

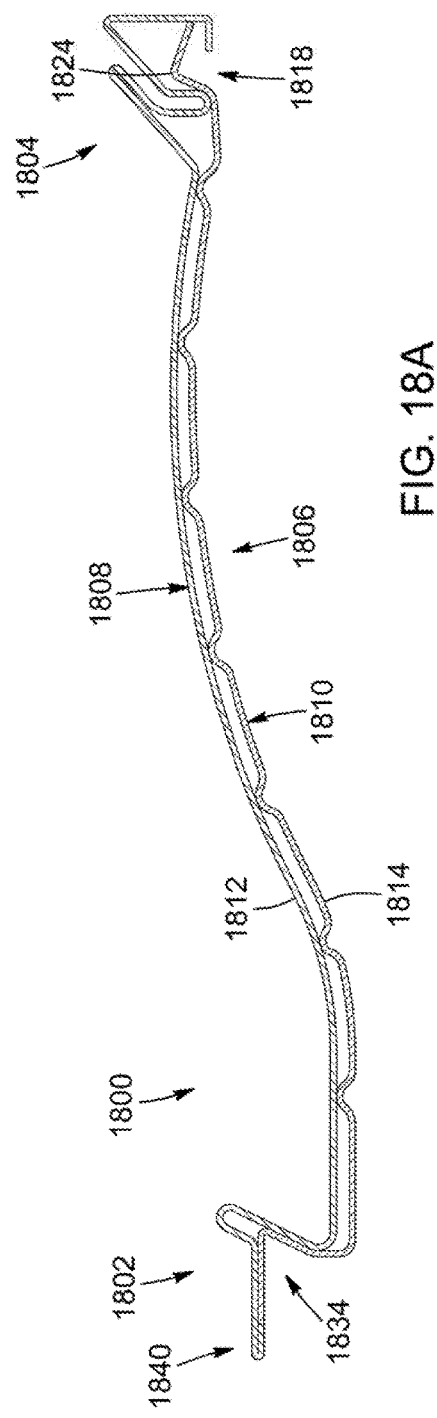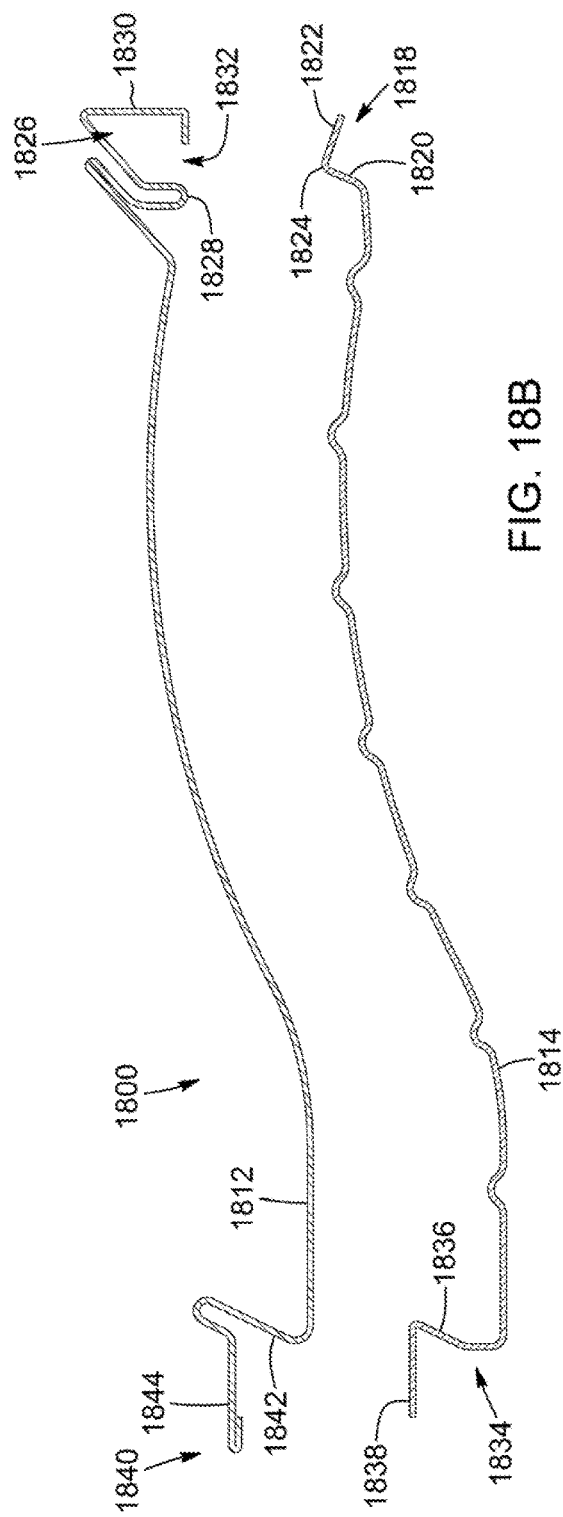

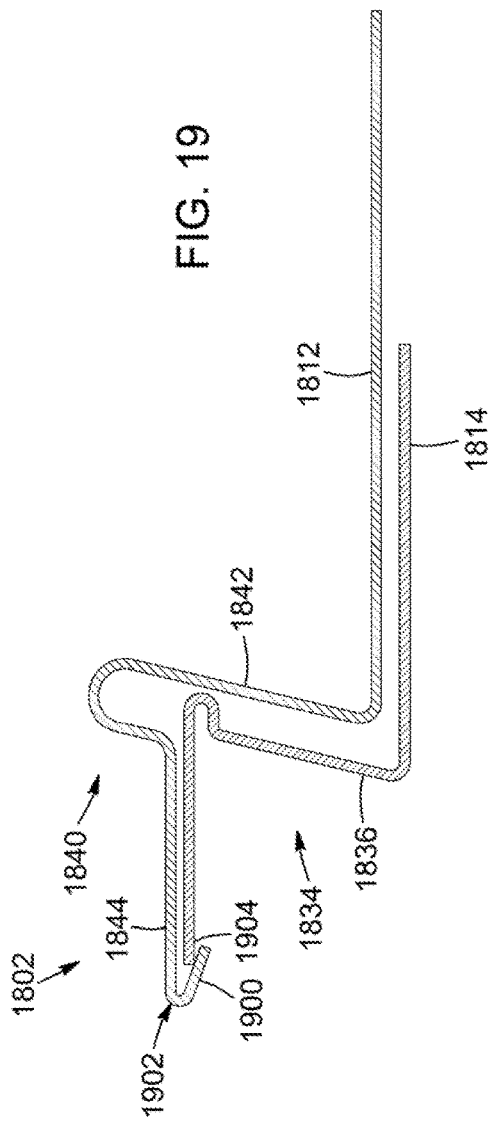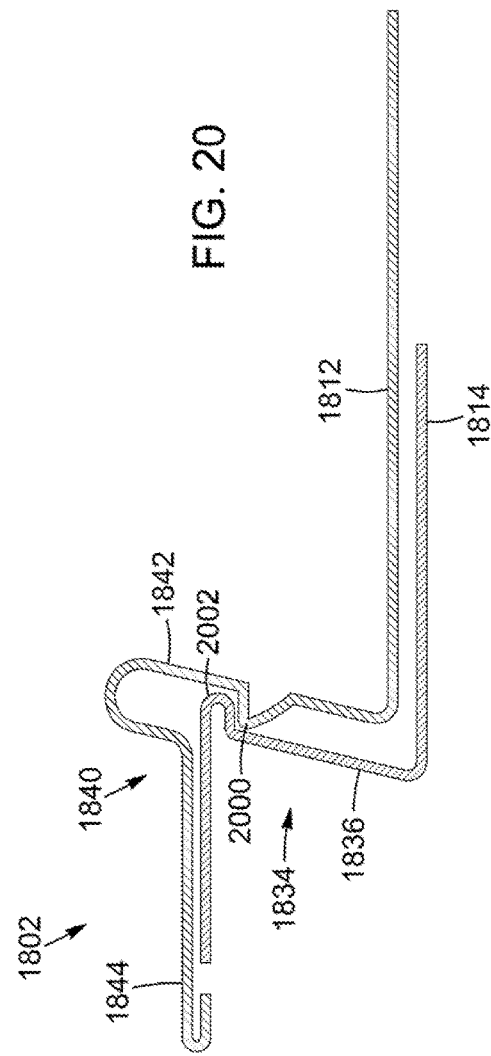

MULTI-LAYER GUTTER COVER AND GUTTER ASSEMBLY COMPRISING THE SAME

RELATED PATENT APPLICATION

The present application claims the benefit of U.S. Provisional Patent Application No. U.S. 62/554,328 filed on Sep. 5, 2017, the specification of which is incorporated herein by reference.

TECHNICAL FIELD

The present disclosure generally relates to gutter covers. More particularly, the technical field relates to gutter covers having multiple layers and to gutter assembly comprising the same.

BACKGROUND

Rain gutters are useful to collect rainwater that runs off the roof of a house or of a building and to route collected rainwater away from the foundation to a proper drainage area in order to avoid damages to the foundation, the soffit, the windows and/or the doors, for instance. Rain gutters generally include a trough channeling the rainwater to a downpipe or downspout, the trough being affixed to a supporting structure of the house or building such as the fascia board.

Leaves and debris may accumulate within the trough of the gutter, which can prevent the rainwater from flowing through the trough. Gutter guards are used to protect the gutter by preventing leaves and debris from enter the trough of the gutter while still permitting rainwater to enter the trough.

Unfortunately, existing gutter covers may become blocked by debris, may be difficult to clean and/or may not properly prevent debris from entering the gutter.

There is therefore a need for a gutter cover which will overcome or alleviate at least one of the above-identified drawbacks.

SUMMARY

According to one aspect, there is provided a gutter cover for covering an opening of a gutter having a front wall, a rear wall and a bottom wall defining a gutter channel, the gutter cover comprising: a front portion operatively engageable with the front wall of the gutter; a rear portion operatively engageable with the rear wall of the gutter; a central portion extending between the front portion and the rear portion and having a first panel and a second panel, the first panel extending above and spaced apart from the second panel, the first panel having a first set of throughholes and the second panel having a second set of throughholes being at least partially offset from the first set of throughholes.

In one embodiment, the first set of throughholes are offset from the second set of throughholes in a widthwise direction of the central portion.

In one embodiment, the first set of throughholes are offset from the second set of throughholes in a lengthwise direction of the central portion.

In one embodiment, the first set of throughholes and the second set of throughholes are partially overlapping in a direction perpendicular to the first and second panels.

In one embodiment, at least one of the first and second set of throughholes are circular.

In one embodiment, one of the first and second set of throughholes are circular and the other one of the first and second set of throughholes are elongated.

In one embodiment, the gutter cover further comprises at least one spacer member extending between the first panel and the second panel to define a space therebetween.

In one embodiment, the at least one spacer member includes a plurality of protrusions extending from at least one of the first and second panels towards the other one of the first and second panels.

In one embodiment, the gutter cover further comprises a first sheet comprising the first panel and a second sheet comprising the second panel.

In one embodiment, at least of the first and second sheets is made of a perforated non-mesh material.

In one embodiment, the first and second sheets are both made of a perforated non-mesh material.

In one embodiment, one of the first and second sheets comprising at least one snap-fit connector configured for resiliently engaging the other one of the first and second sheets to mount the second sheet to the first sheet.

In one embodiment, the first sheet comprises at least one projection extending outwardly away from the first panel extending outwardly away from the first panel and the second sheet comprises the at least one snap-fit connector engageable with a corresponding one of the at least one projection.

In one embodiment, the at least one projection comprises frontwardly and rearwardly extending projections and the at least one snap-fit connector comprises first and second snap-fit connectors configured for engaging the frontwardly and rearwardly extending projections.

In one embodiment, the first and second snap-fit connectors are resiliently deformable outwardly away from each other to engage the frontwardly and rearwardly extending projections.

In one embodiment, each snap-fit connector includes an elongated stem portion extending from the second panel of the second sheet and a hook portion extending from the elongated stem, the stem portions of the first and second snap-fit connectors diverging away from each other and the hook portions being folded towards each other.

In one embodiment, each stem portion is angled relative to the second panel at a first angle.

In one embodiment, the frontwardly and rearwardly extending projections extend away from each other and each one of the frontwardly and rearwardly extending projections is angled relative to the first panel at a second angle greater than the first angle.

In one embodiment, a surface area covered by the second set of throughholes is above a surface area covered by the first set of throughholes.

According to another aspect, there is also provided a gutter assembly comprising: a gutter having a front wall, a rear wall and a bottom wall defining a gutter channel having an open top; and a gutter cover for covering the open top of the gutter, the gutter cover including: a front portion operatively engageable with the front wall of the gutter; a rear portion operatively engageable with the rear wall of the gutter; and a central portion extending between the front portion and the rear portion and having a first panel and a second panel, the first panel extending above and spaced apart from the second panel, the first panel having a first set of throughholes and the second panel having a second set of throughholes being at least partially offset from the first set of throughholes.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 1B is a cross-sectional view of the gutter and gutter cover illustrated in FIG. 1A;

FIG. 4 is a cross-sectional view, taken along line IV-IV, of a segment of the central portion of the gutter cover illustrated in FIG. 3;

FIG. 5 is a cross-sectional view, taken along line V-V, of a segment of the central portion of the gutter cover illustrated in FIG. 3;

FIG. 7 is a top plan view of a segment of the central portion of a gutter cover, in accordance with yet another embodiment;

FIG. 8 is a cross-sectional view, taken along line VIII-VIII, of the section of the central portion of the gutter cover illustrated in FIG. 7;

FIG. 11 is a perspective view of a gutter and a gutter cover, in accordance with yet another embodiment;

FIG. 18A is a schematic drawing of a cross-sectional view of a gutter cover, in accordance with yet another embodiment;

FIG. 18B is an exploded view of the gutter cover illustrated in FIG. 18A;

FIG. 19 is an enlarged cross-section view of a front portion of the gutter cover illustrated in FIG. 18A, in accordance with one embodiment; and FIG. 20 is an enlarged section view of a front portion of the gutter cover illustrated in FIG. 18A, in accordance with an alternative embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Although the embodiments of the gutter cover and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the gutter guard, as will be briefly explained herein and as can be easily inferred herefrom by a person skilled in the art.

Moreover, it will be appreciated that positional descriptions such as "front", "rear", "upper", "bottom" and the like should be taken in the context of the figures only and should not be considered limiting. More particularly, they correspond to the position and orientation of the gutter, when mounted to a supporting surface of a supporting structure, and the gutter cover when mounted onto a gutter. The rear position corresponds to portions adjacent to the supporting surface while the front position corresponds to portions opposed to the supporting surface. The inner position corresponds to portions/surfaces facing the gutter trough while the outer position corresponds to portions/surfaces facing outwardly.

Having discussed the general context of the gutter cover, optional embodiments will be discussed further hereinbelow. The embodiments according to the following description are given for exemplification purposes only.

Figure 1A:
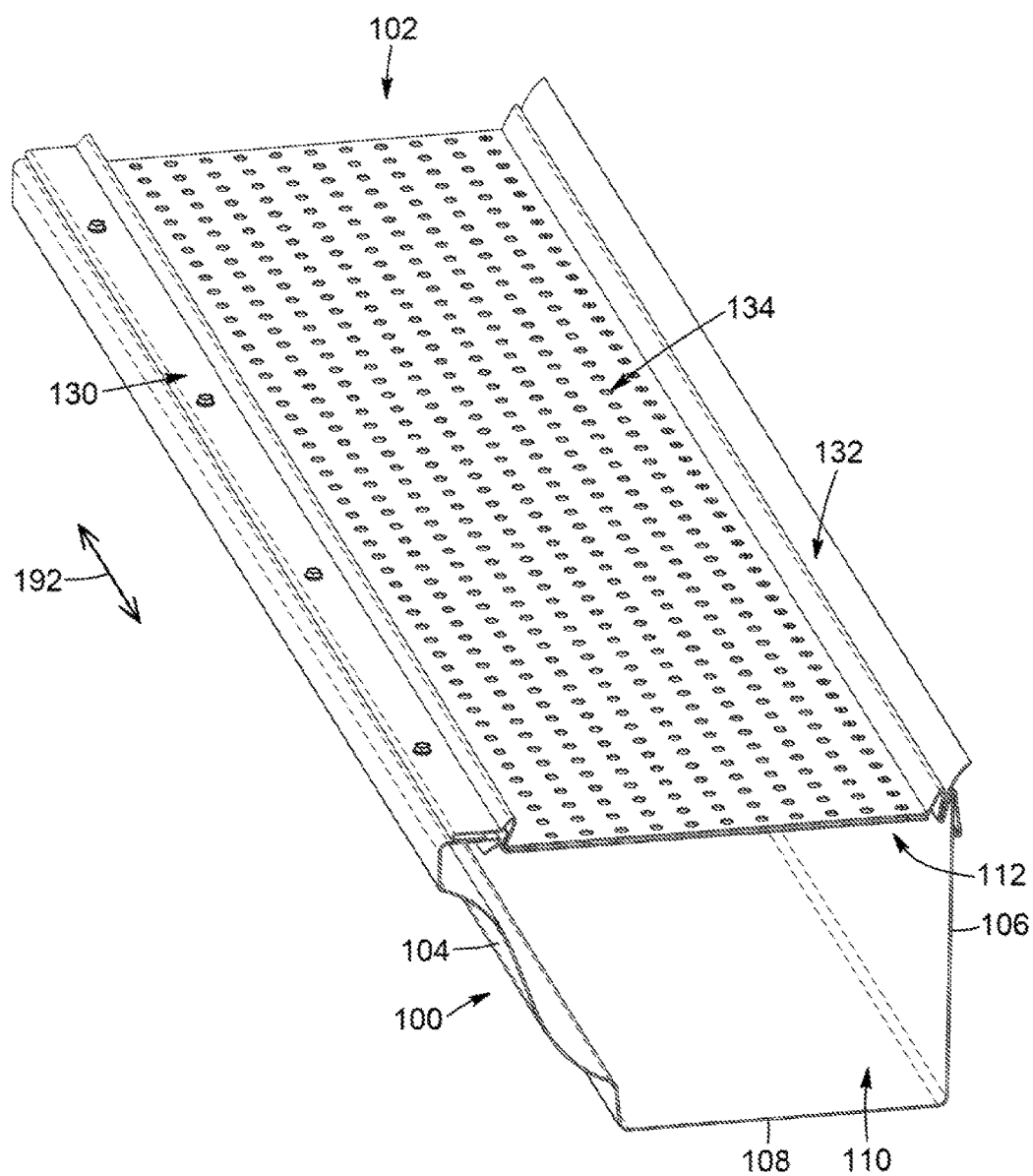
FIG. 1A is a perspective view of a gutter and a gutter cover installed on the gutter, in accordance with one embodiment, in which the gutter cover includes a rear portion having a hook portion for engaging a top edge of a rear wall of the gutter.

Referring first to FIGS. 1A and 1B, there is provided a gutter 100 and a gutter cover 102 installed on the gutter 100, in accordance with one embodiment. The gutter 100 may be installed onto a supporting surface, such as the wall and/or roof of a building.

The gutter 100 includes a front wall 104 and a rear wall 106 extending upwardly from a bottom wall 108 to define a channel 110 having an open top 112.

In the embodiment illustrated in FIGS. 1A and 1B, the front wall 104 of the gutter 100 includes an inclined lower segment 118 which extends generally upwardly and frontwardly from the bottom wall 108, an upright segment 120 extending upwardly from the lower segment 118, an upper rim 122 which extends rearwardly from the upright segment 120, generally parallel to the bottom wall 108, and a flange 124 which extends from the upper rim 122 generally downwardly towards the bottom wall 108 and frontwardly towards the upright segment 120. In this configuration, an inner recess 126 is generally defined between the upright segment 120 and the upper rim 122, and the flange 124 is angled away from the upper rim 122 to define a hook portion 128 which projects into the inner recess 126.

As shown in FIGS. 1A and 1B, when installed on the gutter 100, the gutter cover 102 covers the open top 112 of the gutter 100. In the illustrated embodiment, the gutter cover 102 includes a front portion 130, a rear portion 132 and a central portion 134 extending between the front portion 130 and the rear portion 132. The front portion 130 is configured for engaging the front wall 104 of the gutter 100. In the embodiment illustrated in FIGS. 1A and 1B, the front portion 130 includes a forwardly extending lip 136 that can be disposed on the upper rim 122 of the front wall 104. The front portion 130 can further be fastened to the front wall 104 using an appropriate fastener 138 which extends through the lip 136 and the upper rim 122. In the illustrated embodiment, the fastener 138 includes a threaded bolt which is sized and shaped to engage the lip 136 and the upper rim 122. Alternatively, the fastener 138 may include any other type of fastener which a skilled person would consider to be suitable.

Figure 2A:
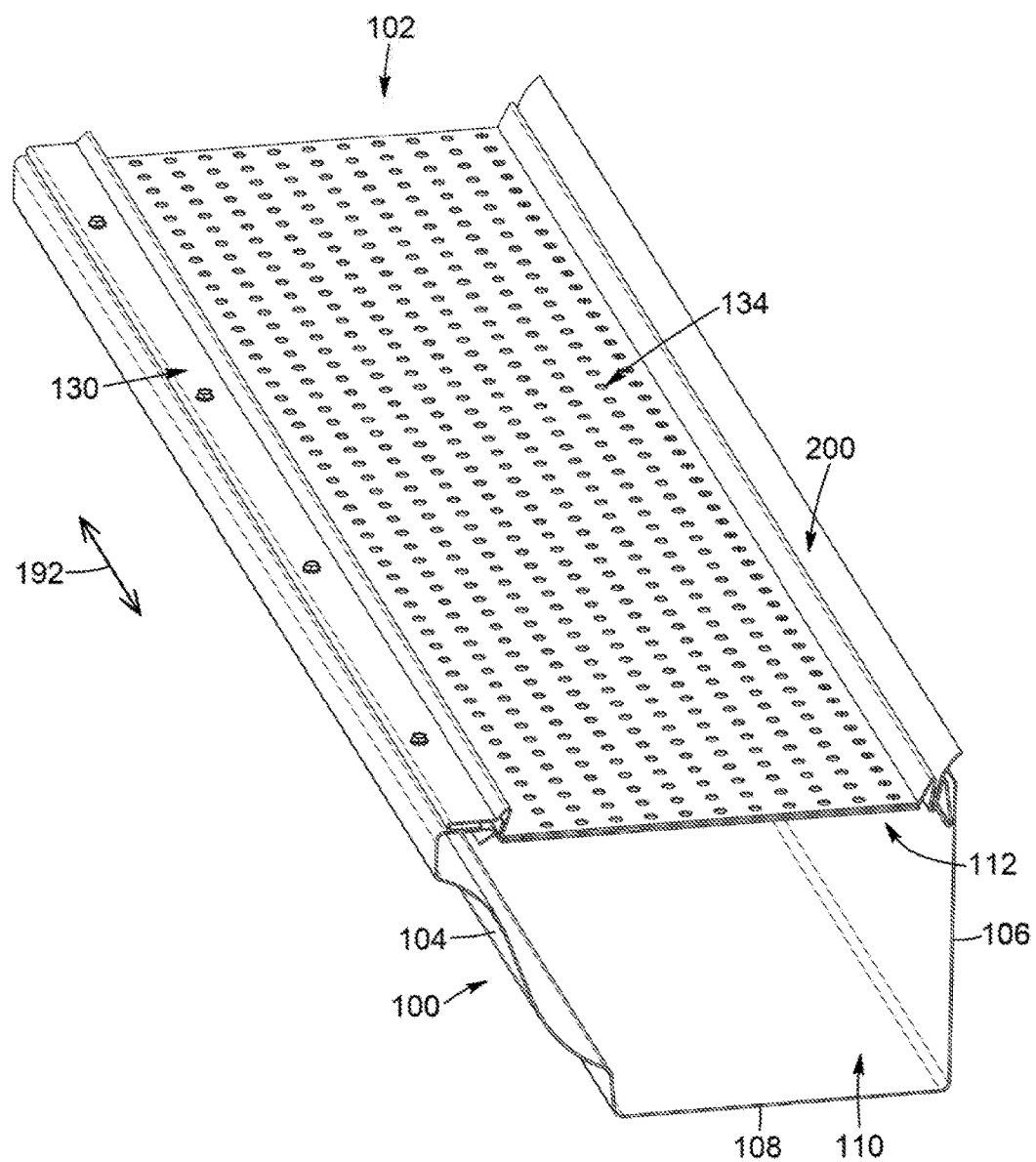
FIG. 2A is a perspective view of a gutter and a gutter cover installed on the gutter, in accordance with another embodiment, in which the gutter cover includes a rear portion which is free of hook portion.
Figure 2B:
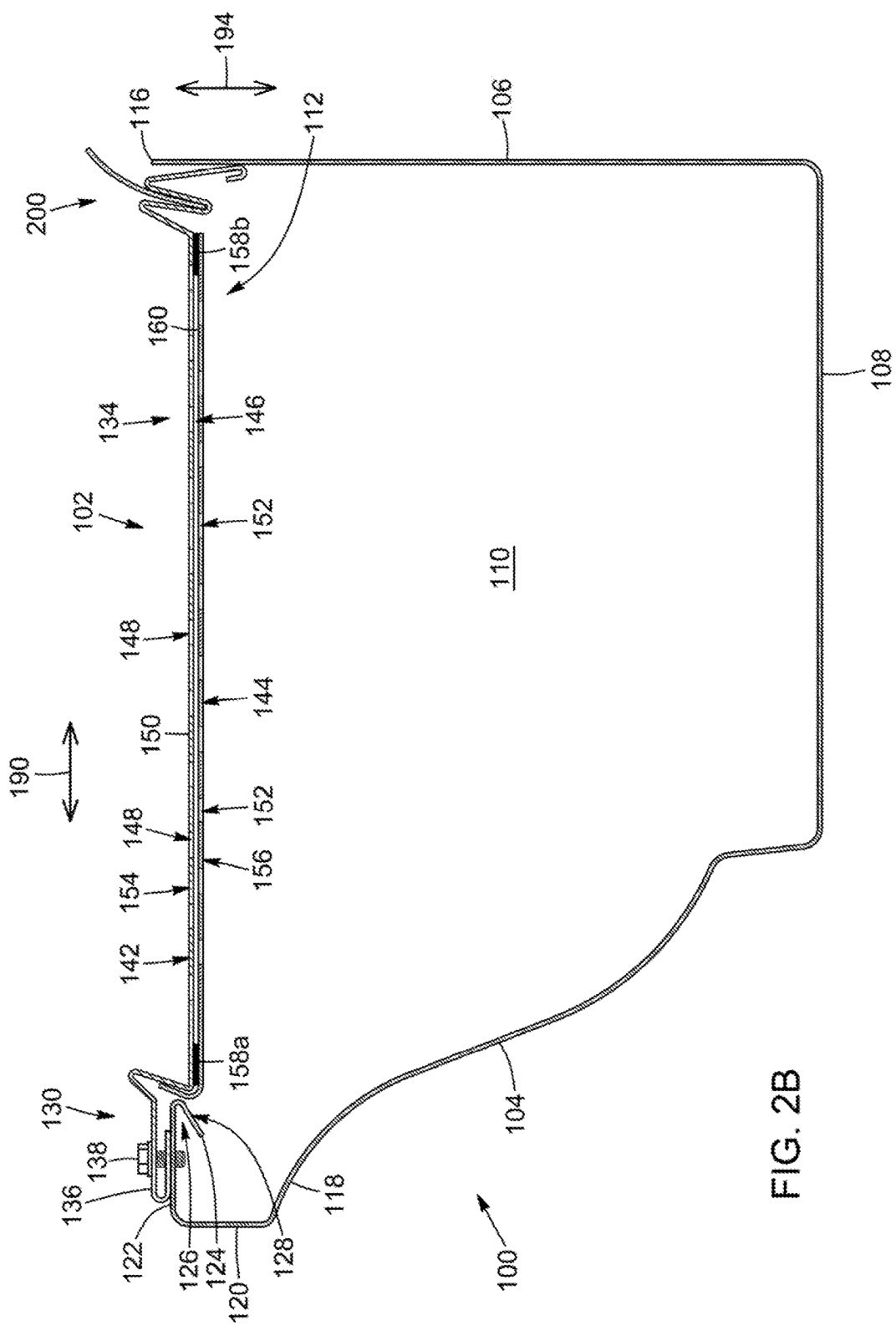
FIG. 2B is a cross-sectional view of the gutter and gutter cover illustrated in FIG. 2A.

Still referring to FIGS. 1A and 1B, the rear portion 132 is further configured for engaging the rear wall 106 of the gutter 100. In the embodiment illustrated in FIGS. 1A and 1B, the rear portion 132 includes a hook portion 140 that is adapted to sit atop a top edge 116 of the rear wall 106. Alternatively, the rear portion 132 could have another configuration allowing the rear portion 132 to engage the rear wall 106. For instance and without being limitative, FIGS. 2A and 2B show the gutter cover 102 having a rear portion 200 which abuts against an inner surface of the rear wall 106 of the gutter 100 instead of sitting atop the top edge 116 of the rear wall 106. In other words, the rear portion 200 is free of hook portion sitting atop the top edge of the rear gutter wall 106. In the embodiment illustrated in FIGS. 2A and 2B, the rear portion 200 still has a profile which generally corresponds to the profile of the rear portion 132 of the gutter cover 102 illustrated in FIGS. 1A and 2B, but the rear portion 200 could instead have any other profile which is suitable for engaging the rear wall 106 of the gutter 100.

Referring back to FIGS. 1A and 1B, when the front portion 130 is appropriately engaged to the front wall 104 and the rear portion 132 is appropriately engaged to the rear wall 106, as shown in FIGS. 1A and 1B, the central portion 134 of the gutter cover 102 extends over and covers the open top 112 of the gutter 100. More specifically, when the front portion 130 is operatively engaged with the front wall 104 and the rear portion 132 is operatively engaged with the rear wall 106, the central portion 134 extends in a widthwise direction thereof, indicated by arrow 190 in FIG. 1B, over the open top 112 of the gutter 100.

As further shown in FIG. 1A, the gutter cover 102 is also generally elongated, such that when the front portion 130 is appropriately engaged to the front wall 104 and the rear portion 132 is appropriately engaged to the rear wall 106, the gutter cover 102 further extends longitudinally in a lengthwise direction, indicated by arrow 192 in FIG. 1A, of the gutter 100.

In the illustrated embodiment, the central portion 134 includes a first panel 142 and a second panel 144. Both panels 142, 144 extend over the open top 112 of the gutter 100, with the first panel 142 overlapping the second panel 144 such that the first panel 142 is located generally above the second panel 144. As best shown in FIG. 1B, the first panel 142 is spaced apart from the second panel 144 to define a space 146 therebetween.

The first panel 142 has a first set of throughholes 148 formed therein that provide fluid communication between an upper surface 150 of the first panel 142 and the space 146 between the first and second panels 142, 144. Liquids collected on the upper surface 150, such as rain water, flows through the first set of throughholes 148 to reach the space 146.

Similarly, the second panel 144 has a second set of throughholes 152 formed therein that provide fluid communication between the space 146 and the gutter channel 110. Liquids having reached the space 146 by flowing through the first set of throughholes 148 further flow through the second set of throughholes 152 to reach the gutter channel 110.

In one embodiment, the space 146 has a thickness which is smaller than a smallest dimension of the throughholes of the first and second sets of throughholes 148, 152. For example, in an embodiment in which the throughholes are circular, the space 146 may be smaller than a diameter of the throughholes.

In the illustrated embodiment, the first panel 142 is defined in a first sheet of material 154 and the second panel 144 is defined in a second sheet of material 156 which is distinct from the first sheet 154 and which is engageable with the first sheet 154. More specifically, the first and second sheets 154, 156 include solid sheets of material as opposed to a mesh material, which is made of strands of material which are woven together or otherwise connected in grid pattern. In other words, the first and second sheets 154, 156 are made of non-mesh material and therefore define non-mesh members. In this embodiment, the first and second sets of throughholes 148, 152 are formed by perforating the first and second sheets 154, 156, which allows the first and second sets of throughholes 148, 152 to be formed on the first and second panels 142, 144 according to a desired pattern and configuration, as will be explained further below.

In an embodiment, the surface area covered by the second set of throughholes 152 is above the surface area covered by the first set of throughholes 148. For instance and without being limitative, the surface area covered by the first set of throughholes 148 can range between about 5% and about 25% of the surface area of the central portion 134 of the gutter cover 102 and, in particular embodiment, between about 5% and about 15% of the surface area of the central portion 134 of the gutter cover 102. For instance and without being limitative, the surface area covered by the second set of throughholes 152 can range between about 8% and about 50% of the surface area of the central portion 134 of the gutter cover 102 and, in particular embodiment, between about 20% and about 40% of the surface area of the central portion 134 of the gutter cover 102.

In a non-limitative embodiment, the surface area of each throughhole of the second set 152 is above the surface area of each throughhole of the first set 148. For instance and without being limitative, a diameter of each throughhole of the first set 148 can range between about 1 mm and about 8 mm. For instance and without being limitative, a diameter of each throughhole of the second set 152 can range between about 2 mm and about 10 mm. In an embodiment wherein the throughholes of the second set 152 are non-circular but elongated in shape, they can have a width ranging between about 2 mm and about 10 mm and a length ranging between about 1 cm and about 8 cm.

In the embodiment shown, the first sheet of material 154 also defines the front portion 130 and the rear portion 132 of the gutter cover 102, while the second sheet 156 is engaged with the first sheet 154 and extends below the central portion 134 thereof.

Still in the illustrated embodiment, the front portion 130 of the gutter cover 102 is formed by bending a front edge region of the first sheet 154 extending frontwardly beyond the second sheet 156 to define the lip 136. Alternatively, the front portion 130 of the gutter cover 102 may be formed by bending a front edge region of the second sheet 154, 156, or by bending front edge portions of both the first and second sheets 154, 156. Similarly, the rear portion 132 of the gutter cover 102 is formed by bending a rear edge portion of the first sheet 154 extending rearwardly beyond the second sheet 156 to define the hook portion 140. Alternatively, the rear portion 132 of the gutter cover 102 may be formed by bending a rear edge region of the second sheet 154, 156, or by bending rear edge portions of both the first and second sheets 154, 156.

In one embodiment, the first and second sheets 154, 156 are made of a metal such as aluminium or the like. Alternatively, the first and second sheets 154, 156 may instead be made of any other rigid material which a skilled person would consider to be suitable.

In yet another embodiment, instead of comprising two distinct sheets, the gutter cover 102 could include a single sheet of material which is folded onto itself to define the first and second panels 142, 144.

In the illustrated embodiment, a pair of spacer members 158a, 158b are disposed and extend between the first panel 142 and the second panel 144. Specifically, the pair of spacer members 158a, 158b includes a first spacer member 158a located proximate to the front portion 130 of the gutter cover 102 and a second spacer member 158b located proximate the rear portion 132 of the gutter cover 102. Alternatively, the spacer members 158a, 158b could be located elsewhere along the widthwise direction 190 of the gutter cover 102.

The spacer members 158a, 158b have a sufficient thickness to cause the first panel 142 and the second panel 144 to be spaced apart from one another and to further maintain the first and second panels 142, 144 spaced apart from each other. More specifically, the spacer members 158a, 158b have the same thickness as the space 146 between the first and second panels 142, 144. Alternatively, instead of providing a pair of space members, only a single spacer member or more than two spacer members may be provided.

In one embodiment, each spacer member 158a, 158b includes a resilient member made of a resilient material such as foam or the like. More specifically, the resilient member may include a foam strip which extends longitudinally in a lengthwise direction 192 along the length of the gutter cover 102. In one embodiment, each spacer member 158a, 158b may be adhered to a bottom surface of the first panel 142 and/or to a top surface of the second panel 144.

Alternatively, the spacer members 158a, 158b may be configured according to one of various alternative configurations. For example, instead of extending longitudinally along the lengthwise direction of the gutter cover 102, the spacer members 158a, 158b could instead extend along the widthwise direction 190 between the front portion 130 and the rear portion 132 of the gutter cover 102.

In another example, the spacer members 158a, 158b may be integrally formed with the first sheet 154 and/or the second sheet 156. For example, the spacer members 158a, 158b may include a plurality of protrusions extending downwardly from the first panel 142 and towards the second panel 144 to abut the second panel 144. Alternatively, the spacer members 158a, 158b may include a plurality of protrusions extending upwardly from the second panel 144 and towards the first panel 142 to abut the first panel 142. In yet another embodiment, the spacer members 158a, 158b may include a first plurality of protrusions extending upwardly from the second panel 144 and a second plurality of protrusions extending downwardly from the first panel 142.

In one embodiment, the protrusions may be aligned with the throughholes 148, 152 and may be formed simultaneously to the throughholes 148, 152 in a single punching operation. Alternatively, the protrusions and the throughholes 148, 152 may be formed in separate manufacturing operations.

Still in the illustrated embodiment, the first and second set of throughholes 148, 152 are defined respectively in the first and second panels 142, 144 according to specific, predetermined patterns. More specifically, the first set of throughholes 148 are at least partially offset from the second set of throughholes 152 a direction perpendicular to the first and second sheet members 154, 156. In other words, the first set of throughholes 148 are non-aligned (i.e. not in register) with the second set of throughholes 152 in a heightwise direction of the gutter cover 102 (indicated by arrow 194 in FIG. 1B), i.e. when viewed from a top plan view.

It will be appreciated that due to the first set of throughholes 148 being at least partially offset from the second set of throughholes 152, liquid that flows from the top surface 150 of the first panel 142 through the first set of throughholes 148 into the space 146 will then flow over at least a portion of a top surface 160 of the second panel 144 before reaching one of the throughholes of the second set of throughholes 152 to further flow into the gutter channel 110.

Having the first set of throughholes 148 at least partially offset from the second set of throughholes 152 may prevent objects and relatively coarse particles to flow into the gutter channel 110. More particularly, the particles/objects may be prevented to flow into the second set of throughholes 152 due to the relatively narrow space 146 between the first panel 142 and the second panel 144.

Figure 3:
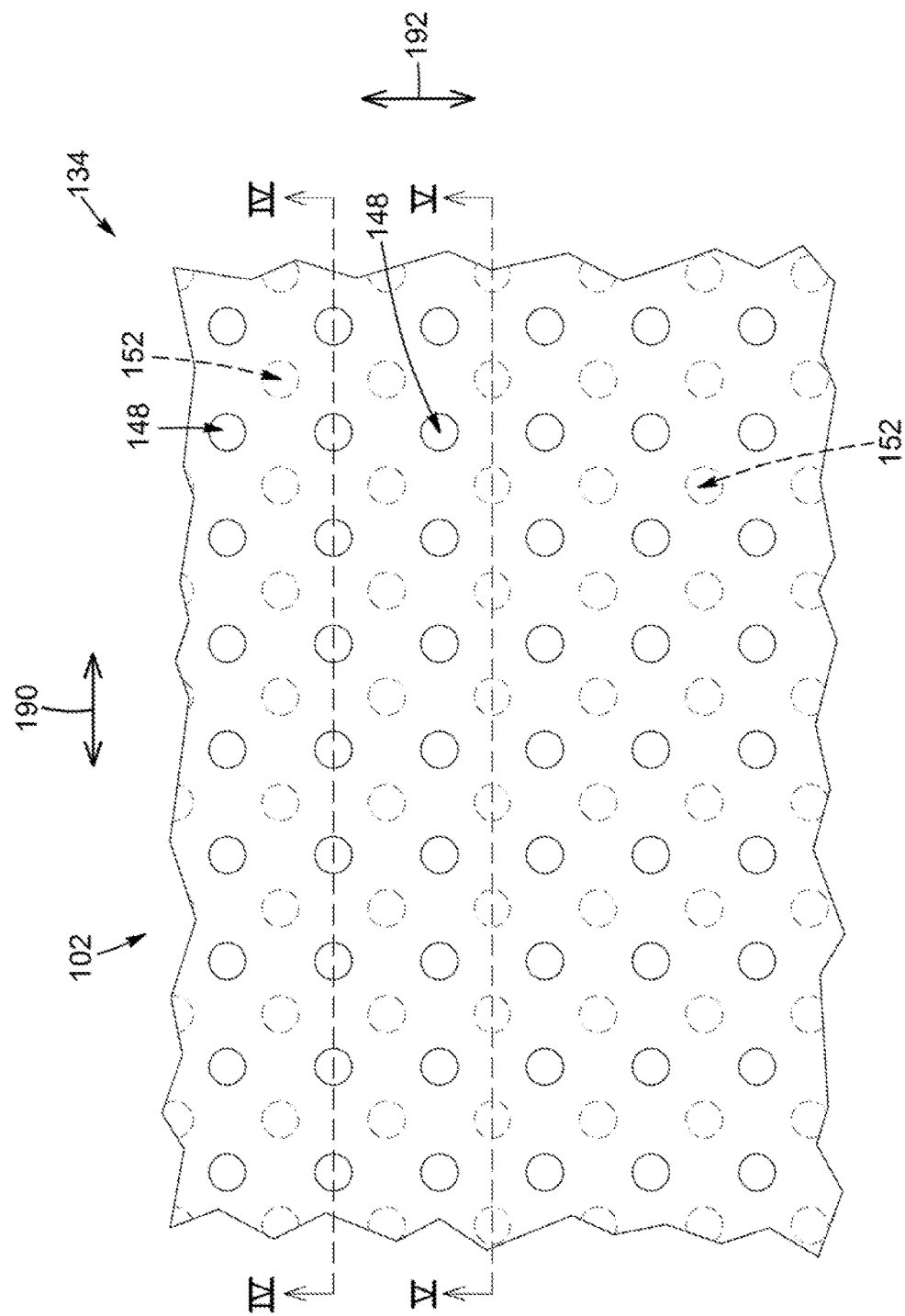
FIG. 3 is a top plan view of a portion of the central portion of the gutter cover illustrated in FIG. 1A.

Referring now to FIG. 3, in the illustrated embodiment, the first set of throughholes 148 are fully offset from the second set of throughholes 152. Specifically, the first set of throughholes 148 are offset from the second set of throughholes 152 in the widthwise direction 190 of the gutter cover 102. In the illustrated example, the first set of throughholes 148 are also offset from the second set of throughholes 152 in the lengthwise direction 192 of the gutter cover 102 such that the first and second sets of throughholes 148, 152 together define a staggered pattern when viewed from above, as shown in FIG. 3.

In this configuration, as shown in FIG. 4, at a given location along the length of the gutter cover 102 where a row of the first set of throughholes 148 is located, no throughholes are formed in the second panel 144 at this location due to the first set of throughholes 148 being offset from the second of throughholes 152 in the lengthwise direction. Similarly, as shown in FIG. 5, at a given location along the length of the gutter cover 102 where a row of the second set of throughholes 152 is located, no throughholes are formed in the first panel 142.

Moreover, in the illustrated embodiment, the first and second sets of throughholes 148, 152 are circular. Alternatively, the first set of throughholes 148 and/or the second set of throughholes 152 could instead be noncircular and have another configuration.

Figure 6:
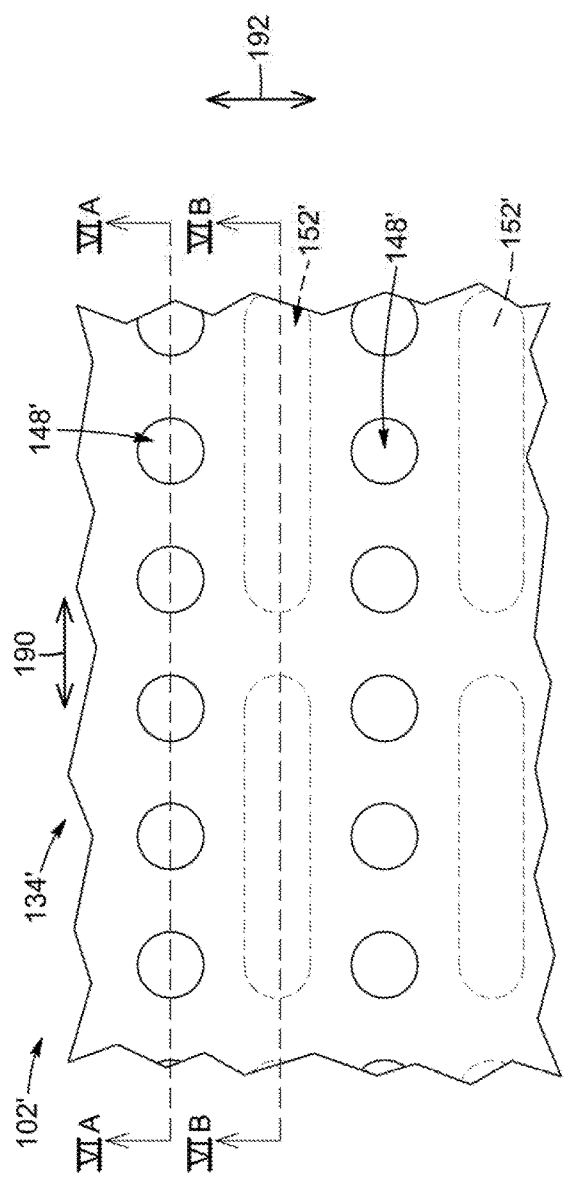
FIG. 6 is a top plan view of a segment of the central portion of a gutter cover, in accordance with another embodiment.
Figure 6A:
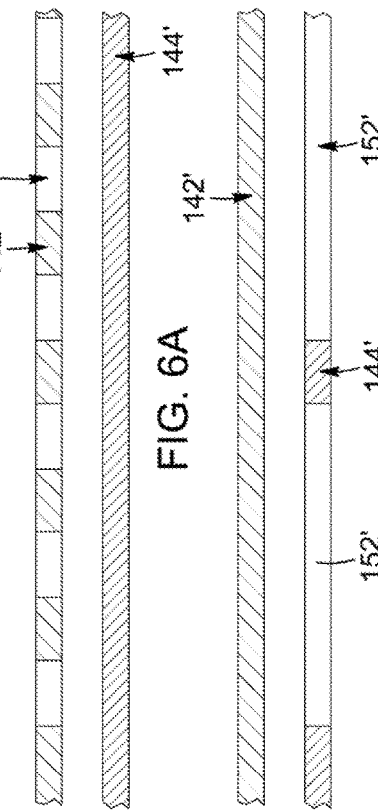
FIG. 6A is a cross-sectional view, taken along line VIA-VIA, of the segment of the central portion of the gutter cover illustrated in FIG. 6.
Figure 6B:
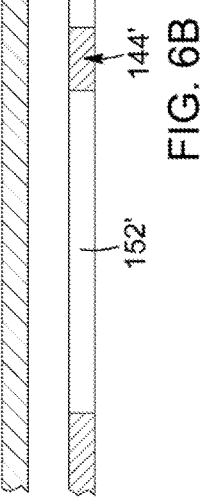
FIG. 6B is a cross-sectional view, taken along line VIB-VIB, of the section of the central portion of the gutter cover illustrated in FIG. 6.

Referring now to FIGS. 6, 6A and 6B, there is shown a segment of a central portion 134' of a gutter cover 102', in accordance with another embodiment. The central portion 134' includes a first panel 142' having a first set of throughholes 148' and a second panel 144' having a second set of throughholes 152'. In this embodiment, the first set of throughholes 148' are circular while the second set of throughholes 152' are oval and elongated. More specifically, the throughholes of the second set of throughholes 152' can extend in the lengthwise direction 192 of the gutter cover 102'. Alternatively, the throughholes of the second set of throughholes 152' could instead extend in a widthwise direction 190 of the gutter cover 102'. In yet another embodiment, the throughholes of the first set of throughholes 148' could instead be elongated, while the throughholes of the second sets of throughholes 152' are circular. In yet another embodiment, the throughholes of both the first and second sets of throughholes 148', 152' could be elongated instead of being circular. It will be appreciated that instead of being circular or elongated, the throughholes could have any other shape and size which a skilled addressee would consider to be appropriate.

Referring now to FIGS. 7 and 8, there is shown a segment of a central portion 134" of a gutter cover 102", in accordance with yet another embodiment. The central portion 134" includes a first panel 142" having a first set of throughholes 148" and a second panel 144" having a second set of throughholes 152". In this embodiment, the first set of throughholes 148" are only partially offset from the second set of throughholes 152". More specifically, the first set of throughholes 148" are not completely aligned with the second set of throughholes 152", but are still partially overlapping with the second set of throughholes 152". In other words, only a portion of each throughholes of the first set of throughholes 148" overlaps in the heightwise direction 194 with a portion of a corresponding throughhole of the second set of throughholes 152", while the rest of the throughhole of the first set of throughholes 148" is non-aligned (is offset from) with the rest of the corresponding throughhole of the second set of throughholes 152". The throughholes of the first and second sets of throughholes 148", 152" are therefore not in register with each other.

As best shown in FIG. 7, the first set of throughholes 148" of the first panel 142" are offset relative to the second set of throughholes 152" of the second panel 144" in both the widthwise and the lengthwise directions 190, 192. Alternatively, the first and the second sets of throughholes 148", 152" could be offset relative to each other only in the widthwise direction 190 or the lengthwise direction 192.

In the embodiment illustrated and described above, the gutter 100 may include an existing gutter such that the gutter cover 102, 102' or 102" may be used with an existing gutter installation. It will be understood that alternatively, the gutter cover 102, 102' or 102" can be applied to other types of gutter installations in which the gutter is different from existing, conventional gutters.

Figure 9:
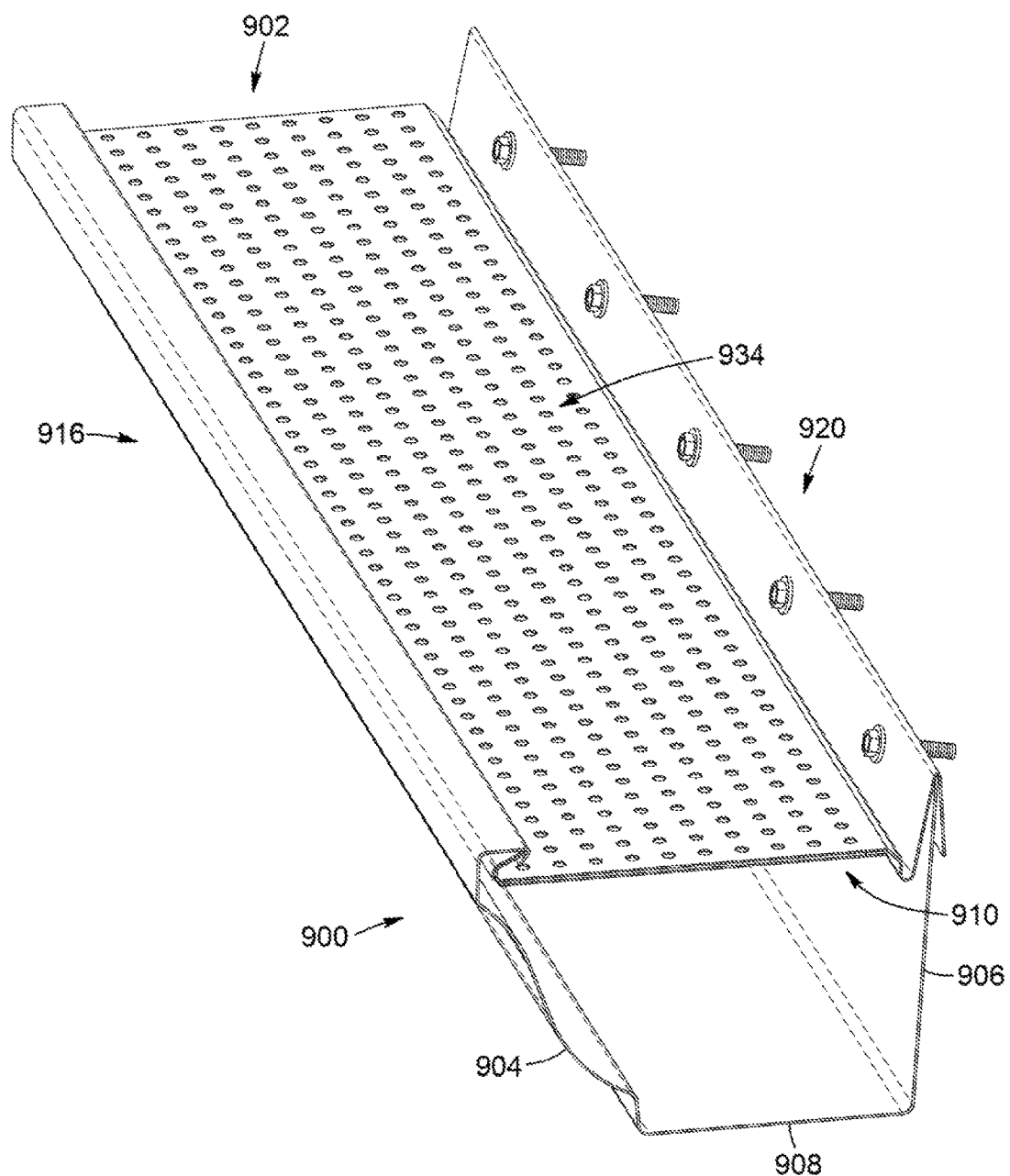
FIG. 9 is a perspective view of a gutter and a gutter cover installed on the gutter, in accordance with another embodiment.
Figure 10A:
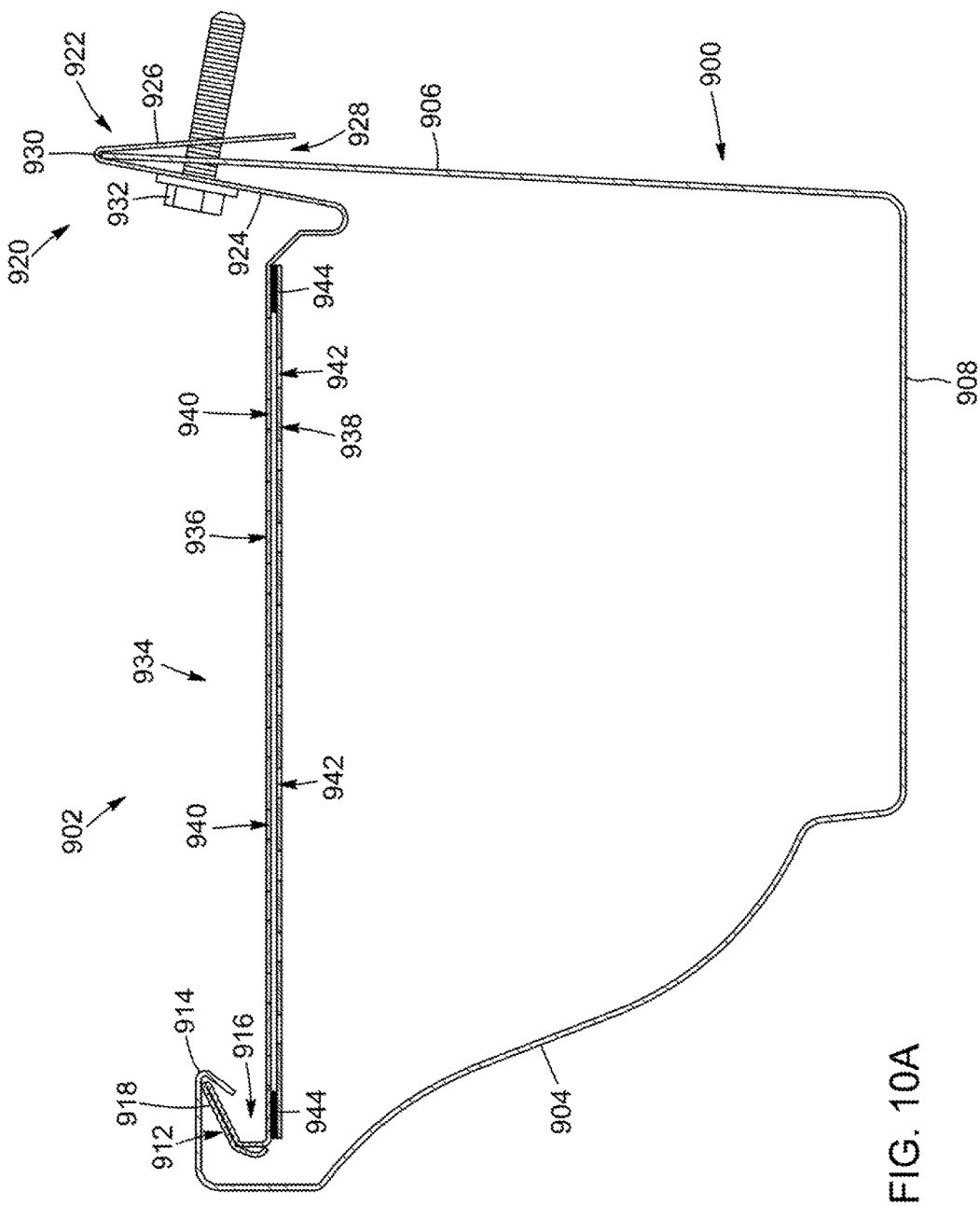
FIG. 10A is a cross-sectional view of the gutter and the gutter cover illustrated in FIG. 9.

Turning to FIGS. 9 and 10A, there is provided a gutter 900 and a gutter cover 902, in accordance with another embodiment. Similarly to the gutter 100 described above, the gutter 900 includes front and rear walls 904, 906 extending upwardly from a bottom wall 908 and has an open top 910 defined between the front and rear walls 904, 906 opposite the bottom wall 908. In this embodiment, in addition to covering the open top 910 of the gutter 900, the gutter cover 902 further defines a continuous gutter hanger used for retaining the gutter 900 on a supporting surface such as a wall.

Still in this embodiment, the front wall 904 of the gutter 900 includes an inner recess 912 and a hook portion 914 which are similar to the inner recess 126 and the hook portion 128 of the gutter 100. The gutter cover 902 further includes a front portion 916 which is received within the inner recess 912 to operatively engage the front wall 904. Specifically, the front portion 916 forms an upward hook portion 918 that engages the hook portion 914 of the front wall 904.

Still in this embodiment, the gutter cover 902 further includes a rear portion 920 which comprises a gutter wall engaging section 922 configured for engaging the rear wall 906 of the gutter 900. The gutter wall engaging section 922 includes an inner segment 924 and an outer segment 926 which is angled away from the inner segment 924 to define a channel 928 therebetween. The channel 928 faces generally downwardly to receive an upper section 930 of the rear wall 906 of the gutter 900, thereby engaging the rear portion 920 with the rear wall 906.

As best shown in FIG. 10A, a suitable fastener 932 may further be used to attach an assembly including the gutter cover 902 and the gutter 900 to the supporting surface (not shown). In the illustrated embodiment, the fastener 932 extends through the inner segment 924, through the upper section 930 of the rear wall 906, through the outer segment 926 and extends rearwardly from the outer segment 926 to engage the supporting surface when the outer segment 926 is placed against the supporting surface.

Similarly to the gutter cover 102, the gutter cover 902 further includes a central portion 934 extending between the front portion 916 and the rear portion 920. The description provided above with reference to the central portion 134 is also applicable to the central portion 934 of the gutter cover 902. Specifically, the central portion 934 also includes a first panel 936 and a second panel 938 spaced from the first panel 936. The first panel 936 is defined in a first sheet of material and the second panel 938 is defined in a second sheet of material which is distinct from the first sheet and which is mounted to the first sheet. The first panel 936 has formed therein a first set of throughholes 940 and the second panel 938 also has formed therein a second set of throughholes 942 which are at least partially offset from the first set of throughholes 940. As with the first and second sets of throughholes 148, 152, the first and second sets of throughholes 940, 942 can be offset according to various offset arrangements described herein, such as the arrangements described above and illustrated in FIGS. 3 to 8. One or more spacing members 944, generally similar to the spacer members 158a, 158b, may also be provided, for example, at front and rear end regions of the central portion 934 to cause the first panel 936 and second panel 938 to be spaced apart from one another. Once again, the alternative spacing members described above in reference to FIG. 1B can be used for the present embodiment.

Figure 10B:
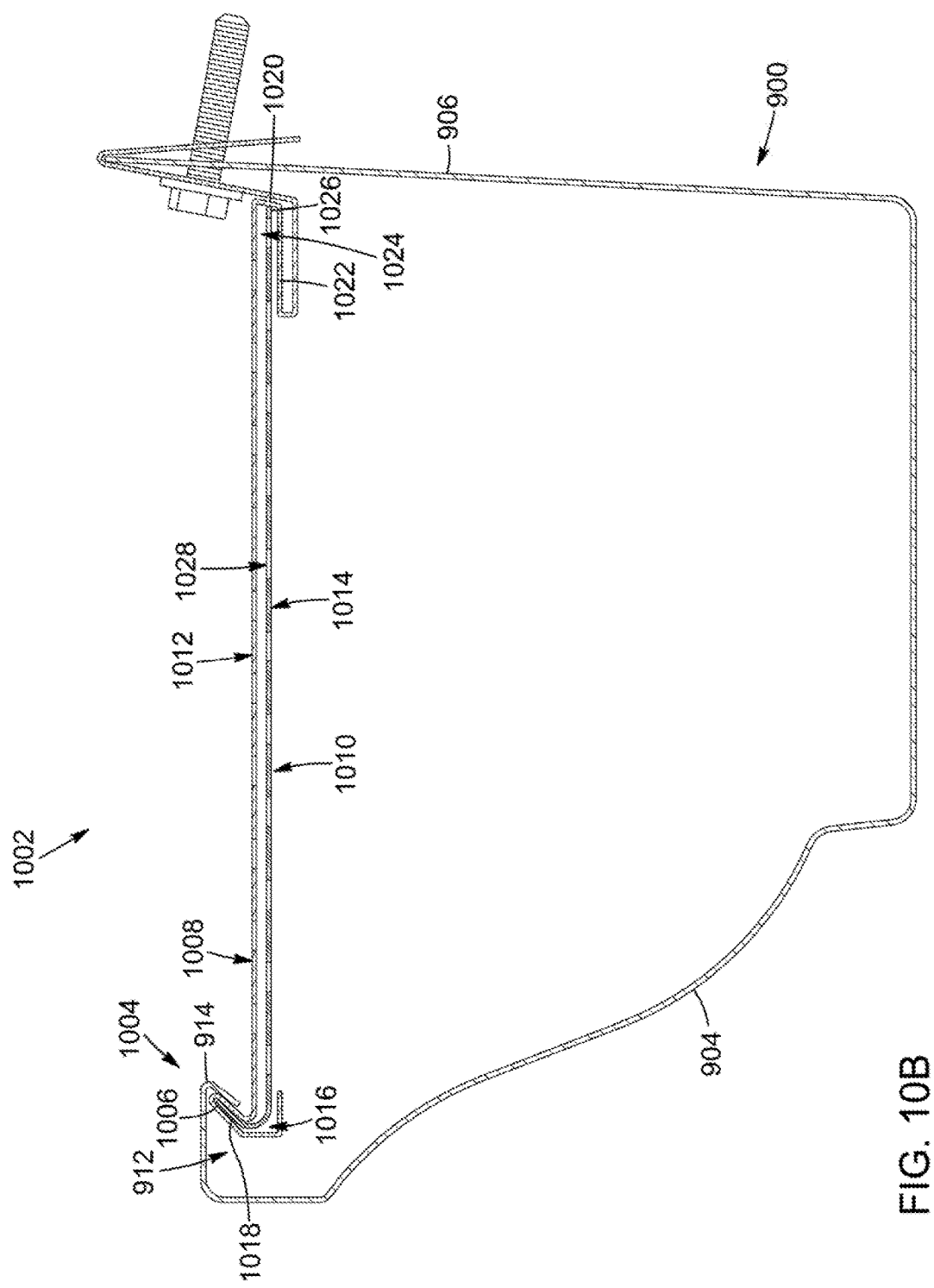
FIG. 10B is a cross-sectional view of a gutter and a gutter cover, in accordance with yet another embodiment.

Referring now to FIG. 10B, there is shown a gutter cover 1002, in accordance with another embodiment, installed on the gutter 900 illustrated in FIGS. 9 and 10A. In this embodiment, the gutter cover 1002 includes a front portion 1004 which forms an upwardly and rearwardly extending hook member 1006. The hook member 1006 is received within the inner recess 912 and retained by the hook portion 914 to form the engagement of the front portion 1004 with the front wall 904 of the gutter 900.

In the embodiment illustrated in FIG. 10B, the gutter cover 1002 includes a first sheet 1008 and a second sheet 1010 connected to the first sheet 1008, the first and second sheets 1008, 1010 being generally similar to the first and second sheets 154, 156 of the gutter cover 102. Specifically, the first sheet 1008 defines a first panel 1012 similar to the first panel 142 and the second sheet 1010 defines a second panel 1014 similar to the second panel 144 described above. In this embodiment, the hook member 1006 can be formed by folding a front end of the first sheet 1008 to form a U-shaped member defining a front channel 1016. A front end of the second sheet 1010 may further be curved upwardly and rearwardly to form a front catch member 1018 configured to be received within the front channel 1016 to form an engagement between the first and second sheets 1008, 1010.

Still referring to FIG. 10B, a rear end of the first sheet 1008 may be folded to form a rearwardly-extending U-shaped member 1020. More specifically, the U-shaped member 1020 includes a rear portion of the first panel 1012 and a lower lip portion 1022 which is spaced downwardly from the first panel 1012 to define a rear channel 1024 between the lower lip portion 1022 and the first panel 1012. A rear end 1026 of the second sheet 1010 is received within the rear channel 1024 and forms an engagement therewith. More specifically, the rear end 1026 is disposed on the lower lip portion 1022. In this configuration, the rear end 1026 abuts the lower lip portion 208 and is thereby substantially held between the lower lip portion 1022 and the first panel 1012.

The front catch member 1018 of the second sheet 1010 and the rearward U-shaped member 1020 is appropriately sized so that when the second sheet 1010 is engaged with the first sheet 1008, the second sheet 1010 is spaced apart from the first sheet 1008 to define a space 1028 between the first and second panels 1012, 1014, similar to the space 146 described above. In this embodiment, the first and second sheets 1008, 1010 are therefore retained with one another from a mechanical engagement and without use of adhesives.

In one embodiment, the second sheet 1010 may be engaged with the first sheet 1008 by slidably inserting the second sheet 1010 in the lengthwise direction 192 through an open lengthwise end of the first sheet 1008. In this embodiment, the second sheet 1010 may further be removed from the first sheet 1008 by sliding the second sheet 1010 longitudinally out of the open lengthwise end of the first sheet 1008.

Figure 10C:
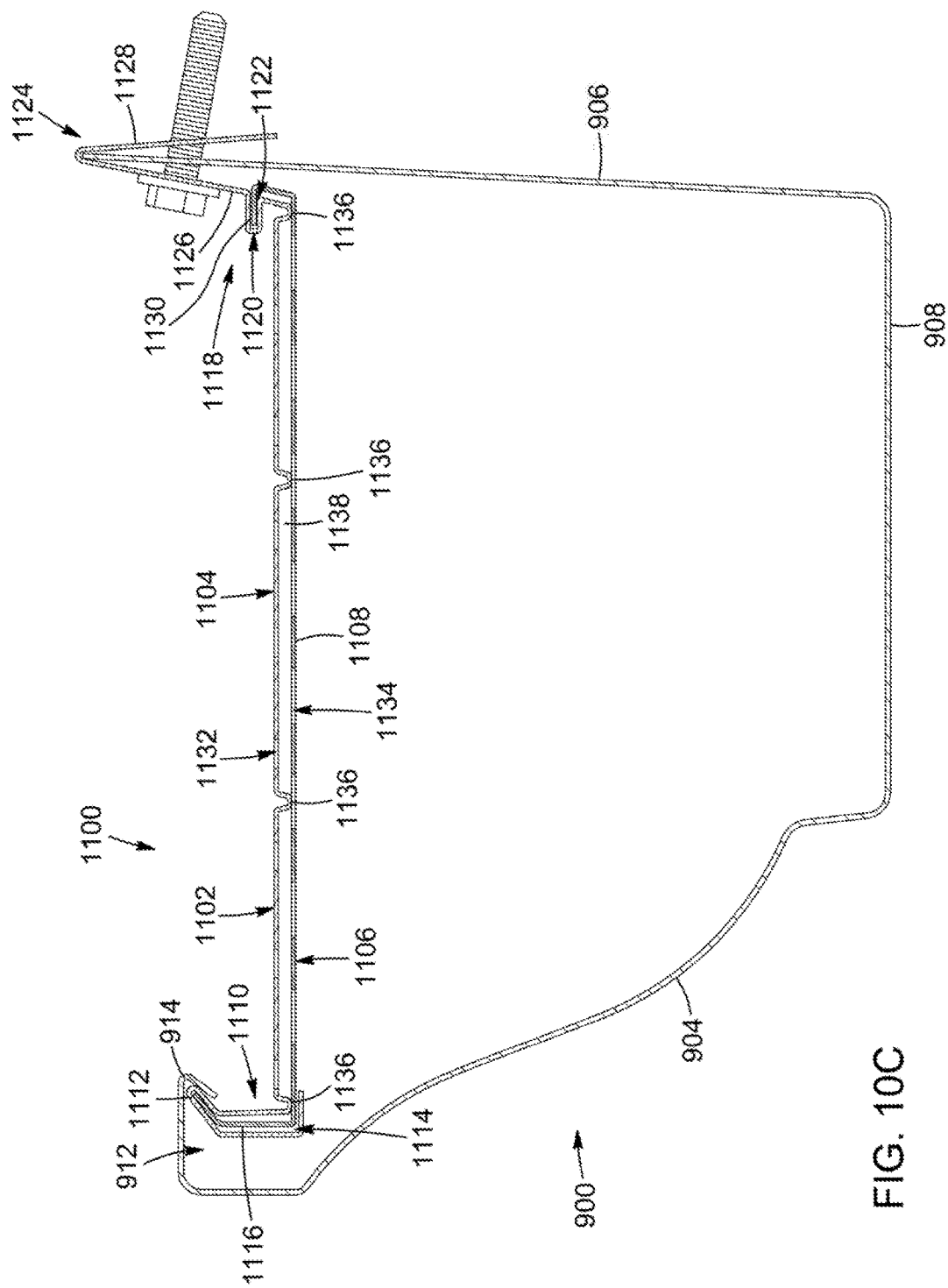
FIG. 10C is a cross-sectional view of a gutter and a gutter cover, in accordance with yet another embodiment.
Figure 10D:
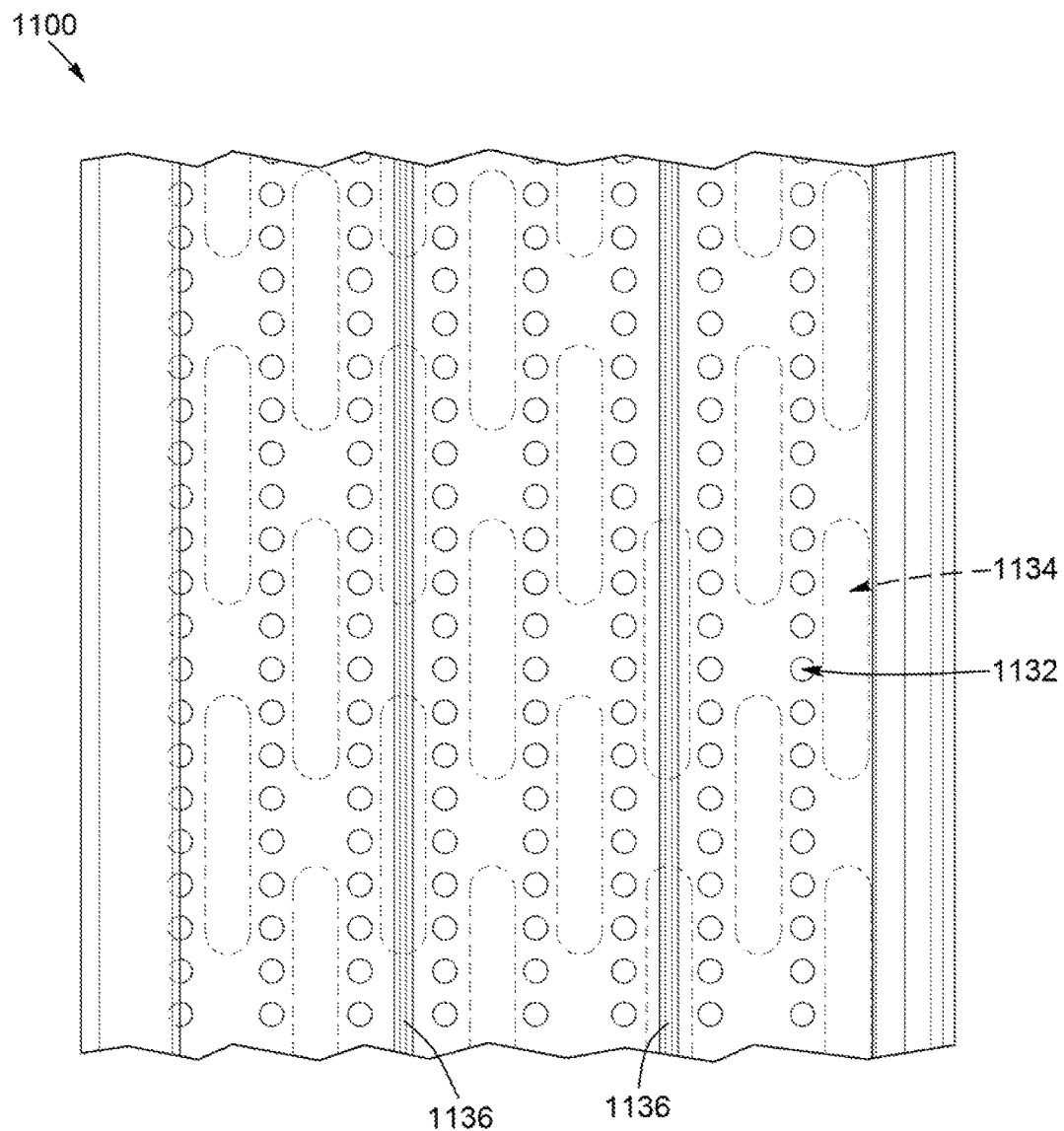
FIG. 10D is a top plan view of the gutter cover illustrated in FIG. 10C.

Now turning to FIGS. 10C and 10D, there is provided a gutter cover 1100 for covering the gutter 900, in accordance with another embodiment. In this embodiment, the gutter cover 1100 includes a first sheet 1102 defining a first panel 1104 and a second sheet 1106 connected to the first sheet 1102 and defining a second panel 1108 spaced from the first panel 1104. The gutter cover 1100 further includes a front portion 1110 which forms an upwardly and rearwardly extending hook member 1112 that is received within the inner recess 912 of the gutter front wall 904. Similarly to the hook member 1006 described above, the hook member 1112 also includes a U-shaped member defining a front channel 1114, and a front end of the second sheet 1106 may be curved upwardly and rearwardly to form a front catch member 1116 configured to be received within the front channel 1114 to thereby form an engagement between the first and second sheets 1102, 1106.

Still referring to FIGS. 10C and 10D, the first sheet 1102 includes a rear end 1118 which is further folded to form a frontwardly-extending U-shaped member 1120 defining a rear channel 1122. More specifically, the gutter cover 1100 includes a gutter wall engaging section 1124 having an inner segment 1126 and an outer segment 1128, similarly to the gutter wall engaging section 922 described above. In this embodiment, the U-shaped member 1120 is formed in the inner segment 1126 of the gutter wall engaging section 1124, and the second sheet 1106 includes a rear end 1130 curved upwardly and forwardly to be received within the rear channel 1122. In one embodiment, the rear end 1130 is further held snuggly (i.e. pinched) within the U-shaped member 1120. For example, the rear end 1130 and the walls of the U-shaped member 1120 may be pinched together during fabrication. It will be appreciated that this configuration allows the first and second sheets 1102 and 1106 to also be retained with one another from a mechanical engagement without use of adhesives.

The first panel 1104 has formed therein a first set of throughholes 1132 and the second panel 1108 also has formed therein a second set of throughholes 1134 which are at least partially offset from the first set of throughholes 1132. As with the first and second sets of throughholes 148, 152, the first and second sets of throughholes 1132, 1134 can be offset according to various offset arrangements described herein, such as the arrangements described above and illustrated in FIGS. 3 to 8.

In the embodiment illustrated in FIGS. 10C and 10D, the first sheet 1102 includes a plurality of protruding ribs 1136 that extends downwardly from the first panel 1104 towards the second panel 1108 and abut the second panel 1108 to thereby act as spacing members. Specifically, the ribs 1136 maintain the first and second panels 1104, 1108 spaced from each other to thereby define a space 1138 between the first and second panels 1104, 1108.

As best shown in FIG. 10D, the ribs 1136 extend generally lengthwise relative to the gutter cover 1100. Alternatively, the ribs 1136 could instead extend widthwise relative to the gutter cover 1100, extend obliquely relative to the gutter cover 1100, be curved or define any other shape and configuration which a skilled person would consider to be appropriate.

It will also be understood that, instead of being formed in the first sheet 1102, the ribs 1136 could alternatively be formed in the second sheet 1106 and protrude upwardly to abut against the first sheet 1102, such that the first sheet 1102 has a substantially smooth lower surface that is free of any protrusions. In yet another embodiment, the ribs 1136 could also be formed in both the first and second sheets 1102, 1106.

Figure 12:
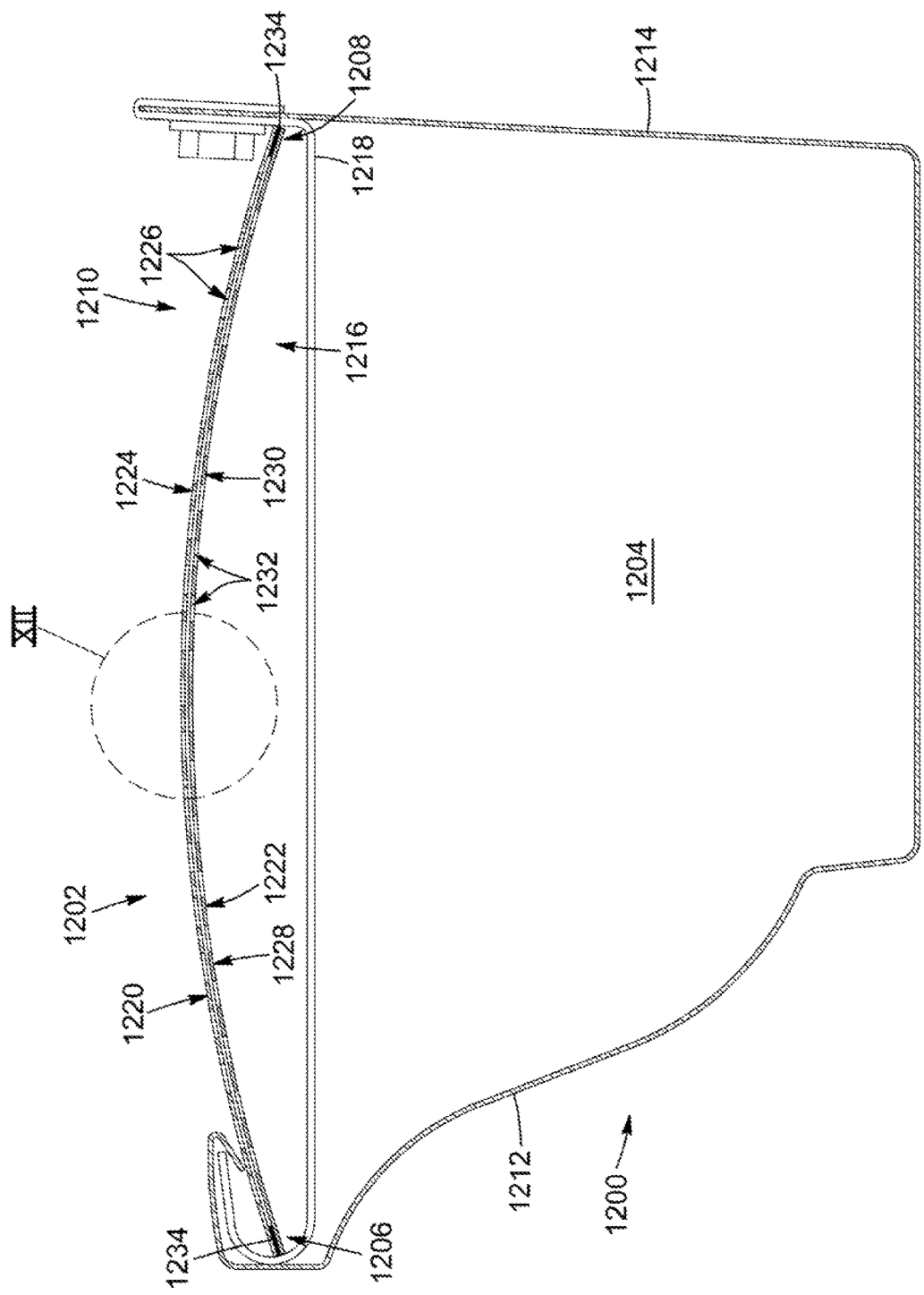
FIG. 12 is a cross-sectional view of the gutter and gutter cover illustrated in FIG. 11.
Figure 12A:
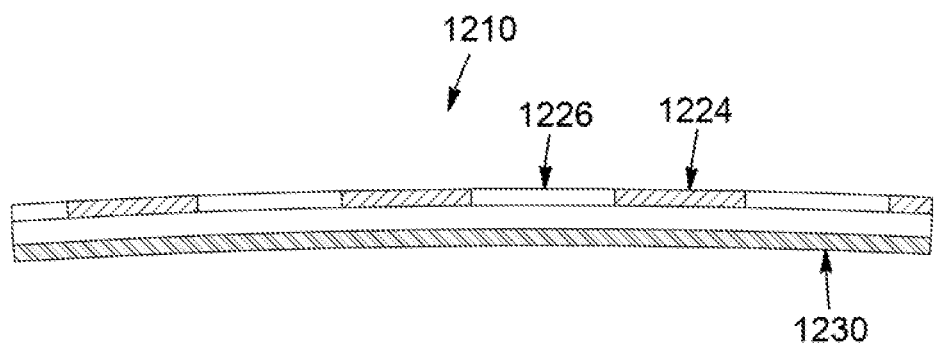
FIG. 12A is an enlarged cross-sectional view of the central portion of the gutter cover illustrated in FIG. 12, taken from area XII at a first longitudinal location along the gutter cover.
Figure 12B:
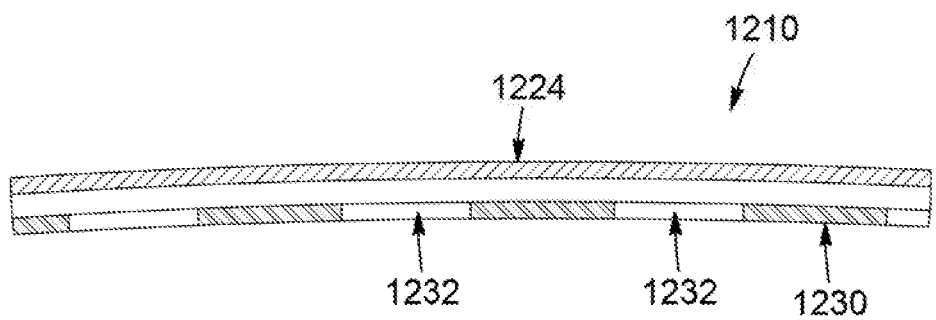
FIG. 12B an enlarged cross-sectional view of the central portion of the gutter cover illustrated in FIG. 12, taken from area XII at a second longitudinal location along the gutter cover.

Referring now to FIGS. 11 to 12B, there is provided a gutter 1200 and gutter cover 1202, in accordance with yet another embodiment. The gutter cover 1202 has the configuration of a multi-sheet assembly that is relatively rigid and resilient. The gutter cover 1202 is also substantially flexible. More specifically, the gutter cover 1202 is sufficiently flexible to modify its curved profile so that it can be inserted into a rain channel 1204 of the gutter 1200.

Similarly to the gutter covers described above, the gutter cover 1202 includes a front portion 1206, a rear portion 1208 and a central portion 1210 extending between the front and rear portions 1206, 1208. In the embodiment illustrated in FIGS. 11 to 12B, the front portion 1206 corresponds to a front longitudinal edge region of the gutter cover 1202 and the rear portion 1206 corresponds to a rear longitudinal edge region of the gutter cover 1202. The front portion 1206 operatively engages a front wall 1212 of the gutter 1000, such as by frictionally engaging an inner face of the front wall 1212. Similarly, the rear portion 1208 operatively engages a rear wall 1214 of the gutter 1200, such as by frictionally engaging an inner face of the rear wall 1214. When so engaged, the gutter cover 1202 is retained within the gutter 1200, and a central portion 1210 of the gutter cover 1202 extends over an open top 1216 of the gutter 1200. The rear longitudinal edge region of the gutter cover 1202 can further extend below and engage with spaced apart gutter hooks 1218 used for retaining the gutter 1200 to the supporting surface. The gutter cover 1202 can be used in substantially the same way as the gutter cover described in U.S. patent application Ser. No. 15/605,283.

The gutter cover 1202, being a multi-sheet assembly, includes a first sheet 1220 and a second sheet 1222 that are overlapping. The first sheet 1220 defines a first panel 1224 in which are formed a first set of throughholes 1226 and the second sheet 1228 defines a second panel 1230 in which are formed a second set of throughholes 1232. As in the embodiments described above and illustrated in FIGS. 1A to 10D, the first set of throughholes 1226 and the second set of throughholes 1232 are at least partially offset. The throughholes 1226, 1232 can be offset according to one of the various offset arrangements described above such as the arrangements illustrated in FIGS. 3 to 8. One or more spacing members 1234 can also be provided, for example, at front and rear end edge regions of the central portion 1210 to cause the first panel 1224 and the second panel 1230 to be spaced apart from one another.

Figure 13:
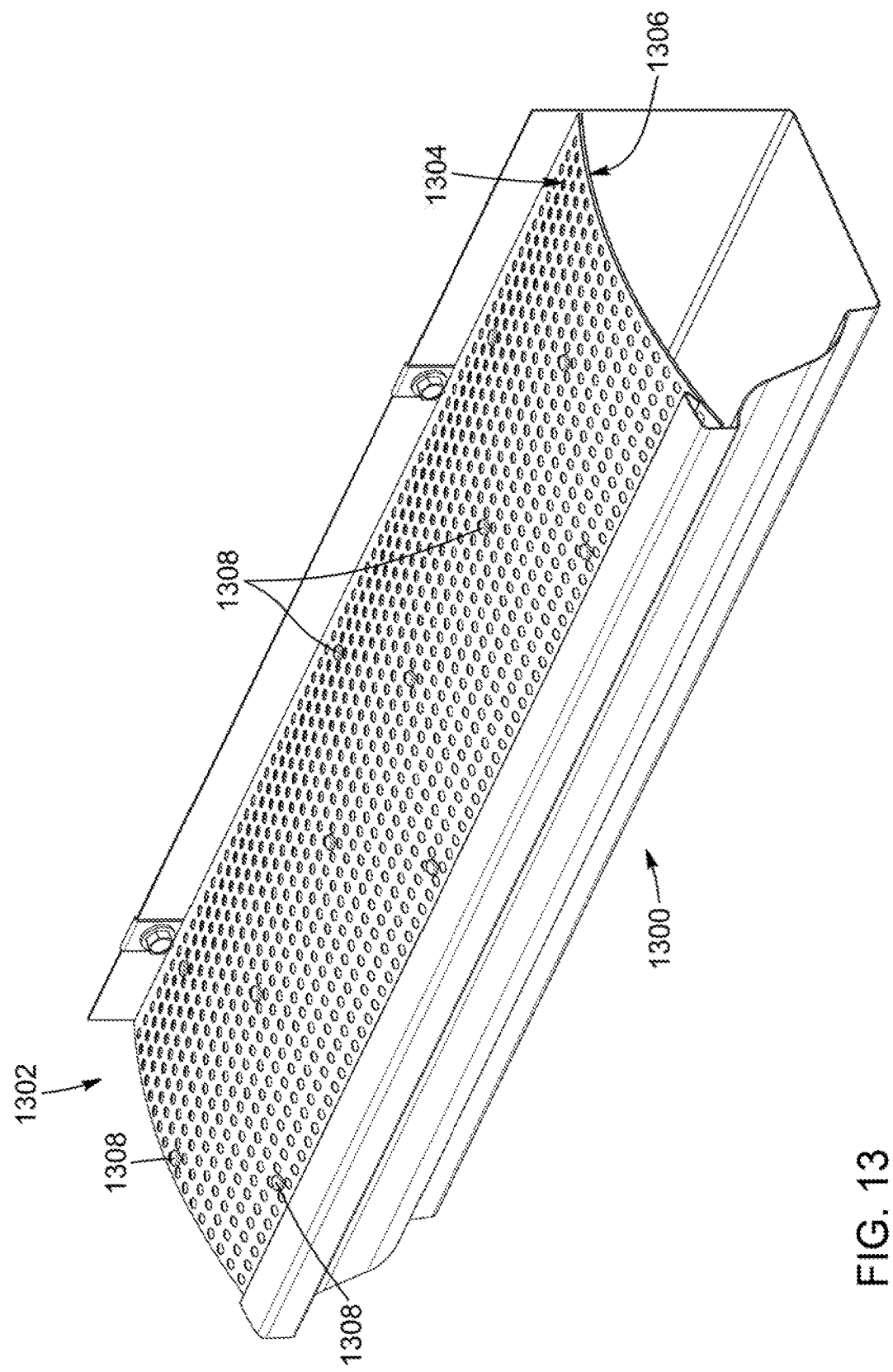
FIG. 13 is a perspective view a gutter and a gutter cover installed on the gutter, in accordance with yet another embodiment.

Referring now to FIG. 13, there is provided a gutter 1300 with a gutter cover 1302 installed on the gutter 1300, in accordance with yet embodiment. The gutter cover 1302 is substantially similar to the gutter cover 1202 illustrated in FIGS. 11 to 12B and described above, and includes a first sheet 1304 and a second sheet 1306 spaced from the first sheet 1304. In this embodiment, a plurality of fasteners 1308 are provided at various locations of the first sheet 1304 and of the second sheet 1306 attach the first sheet 1304 and the second sheet 1306 together while maintaining their spaced apart configuration. In the illustrated example, the fasteners 1308 also act as spacer members to maintain the first and second sheets 1304, 1306 spaced apart from each other. In one embodiment, the fasteners 1308 may be removable to allow the first sheet 1304 and the second sheet 1306 to be detached from each other, for maintenance purposes for example. Alternatively, instead of fasteners, other connecting mechanisms can be used to attach the first sheet 1304 and second sheet 1306 together while also allowing the first and second sheets 1304, 1306 to be selectively detached from one another. In yet another embodiment, the fasteners 1308 may instead include permanent fasteners such as rivets which may not allow the first and second sheets 1304, 1306 to be detached from each other, Now turning to FIGS. 14 to 16, there is provided a gutter cover 1402 configured to be installed on the gutter 900, in accordance with another embodiment.

The gutter cover 1402 is generally similar to the gutter cover 902 and includes a front portion 1404, a rear portion 1406 and a central portion 1408 extending between the front and rear portions 1406. The front portion 1404 is configured to engage the front wall 904 of the gutter 900, the rear portion 1406 is configured to engage the rear wall 906 of the gutter 900 such that the central portion 1408 extends widthwise over the open top 910 of the gutter 900.

In the illustrated embodiment, the front portion 1404 forms an upward hook portion 1410 that engages the hook portion 914 of the front wall 904. Still in the illustrated embodiment, the rear portion 1406 comprises a gutter wall engaging section 1412 configured for engaging the rear wall 906 of the gutter 900. The gutter wall engaging section 1412 includes an inner segment 1414 and an outer segment 1416 which is angled away from the inner segment 1414 to define a channel 1418 therebetween. The channel 1418 faces generally downwardly to receive the upper section 930 of the gutter rear wall 906, thereby engaging the rear portion 1406 with the rear wall 906.

Also similarly to the gutter cover 902, the central portion 1408 includes a first panel 1420 and a second panel 1422 spaced from the first panel 1420. The first panel 1420 further includes a first set of throughholes 1424 and the second panel 1422 includes a second set of throughholes 1426. In the illustrated embodiment, the first set of throughholes 1424 are further offset from the second set of throughholes 1426, as explained above. More specifically, the throughholes 1424, 1426 can be offset according to one of the various offset arrangements described above such as the arrangements illustrated in FIGS. 3 to 8.

Figure 14:
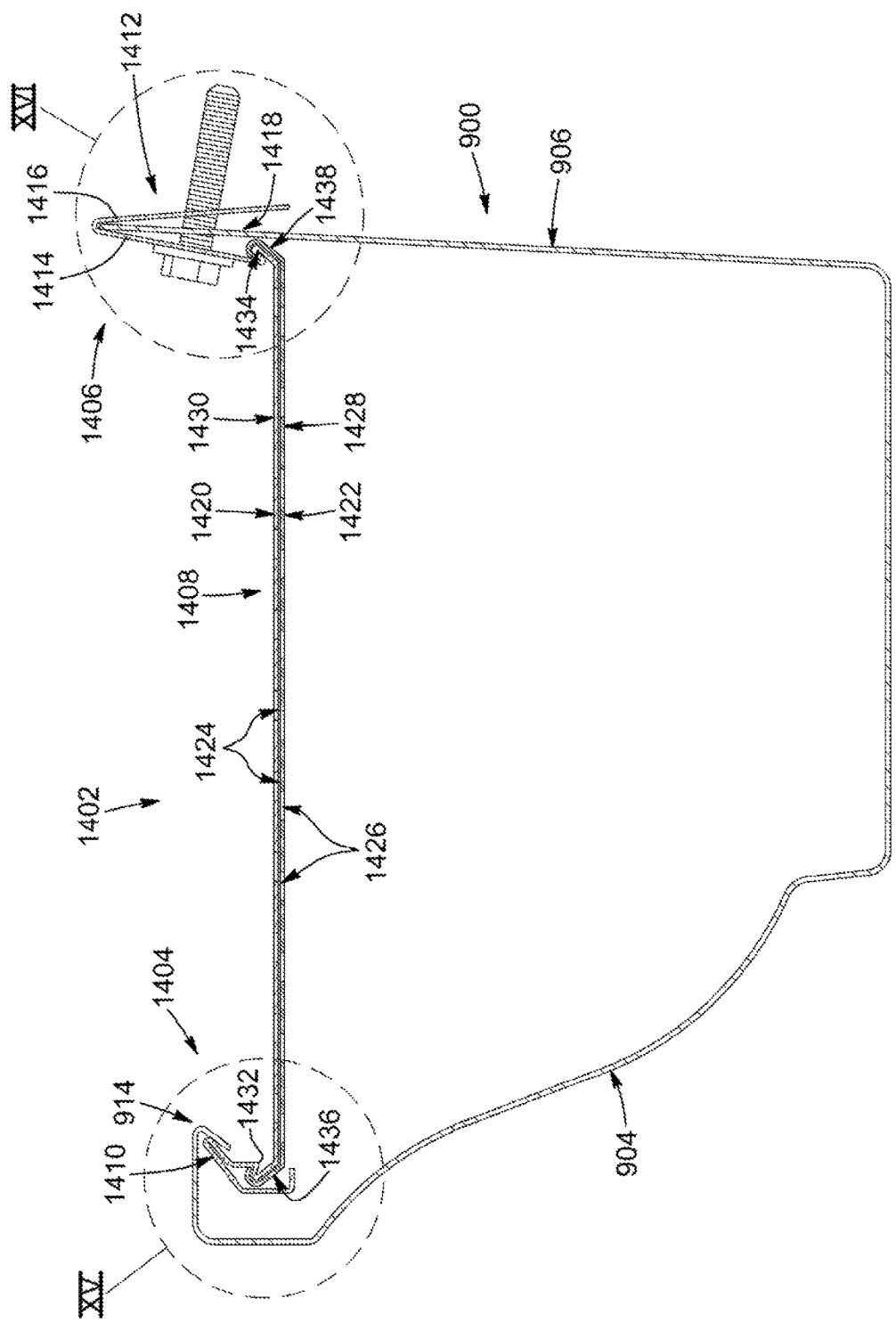
FIG. 14 is a cross-sectional view of a gutter and a gutter cover, in accordance with yet another embodiment.
Figure 15:
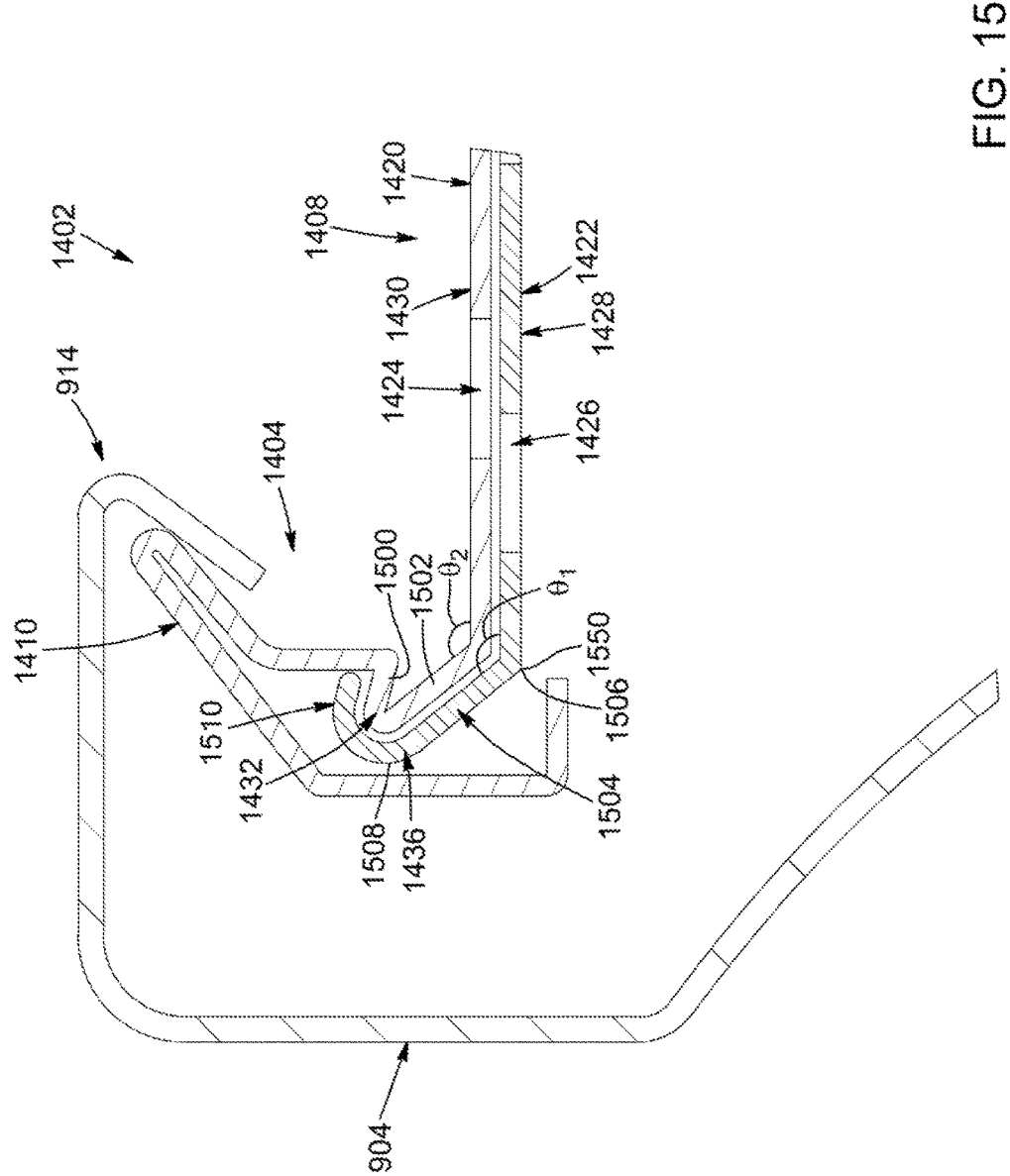
FIG. 15 is an enlarged cross-sectional view, taken from area XV, of the gutter and gutter cover illustrated in FIG. 14.
Figure 16:
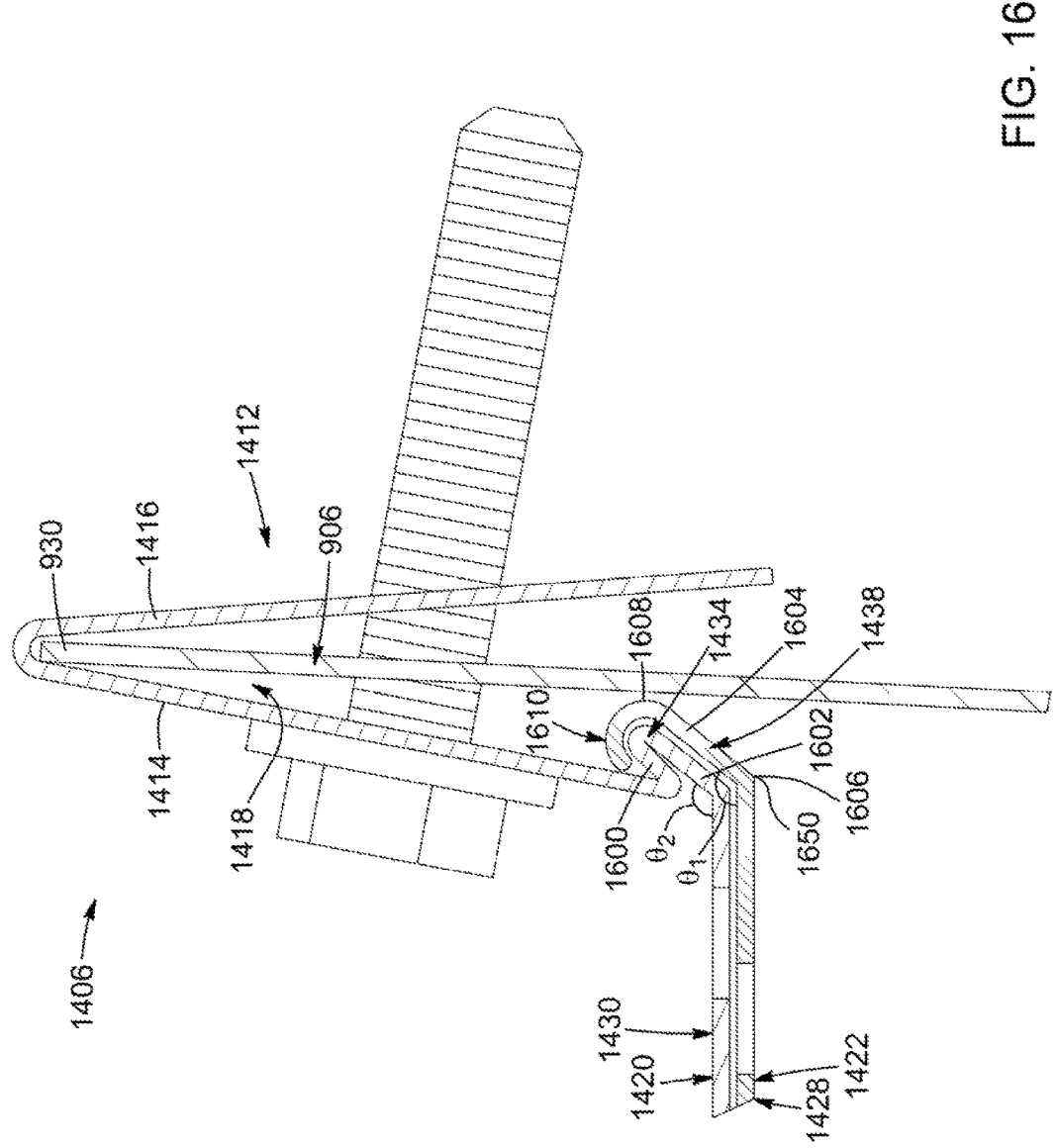
FIG. 16 is an enlarged cross-sectional view, taken from area XVI, of the gutter and gutter cover illustrated in FIG. 14.

In the embodiment illustrated in FIGS. 14 to 16, the second panel 1422 is defined in a second sheet 1428, distinct from a first sheet 1430 including the first panel 1420 and engageable therewith. More particularly, the second sheet 1428 is also removably mounted to the first sheet 1430. Specifically, the first sheet 1430 includes frontwardly and rearwardly extending projections 1432, 1434, defined by folds in the first sheet 1430, and the second sheet 1428 includes first and second snap-fit connectors 1436, 1438 which are adapted to resiliently engage the frontwardly and rearwardly extending projections 1432, 1434. In the illustrated embodiment, the frontwardly and rearwardly extending projections 1432, 1434 extend generally upwardly and away from each other, and the snap-fit connectors 1436, 1438 are resiliently deformable outwardly away from each other to engage the front and rear projections 1432, 1434.

Referring to FIGS. 15 and 16, the frontwardly extending projection 1432 is located between the first panel 1420 and the hook portion 1410. In the illustrated embodiment, the frontwardly extending projection 1432 is formed by a fold in the first sheet 1430 and includes an upper segment 1500 and a lower segment 1502 which is generally angled away from the first panel 1420.

Similarly, the rearwardly extending projection 1434 is located between the inner segment 1414 of the rear portion 1406 and the first panel 1420. The rearwardly extending projection 1434 is also formed by a fold in the first sheet 1430 and includes an upper segment 1600 and a lower segment 1602 which is generally angled away from the first panel 1420.

Still referring to FIGS. 15 and 16, the first or front snap-fit connector 1436 of the second sheet 1428 includes an elongated stem portion 1504 which has a lower end 1506 extending from a front end 1550 of the second panel 1422 and an upper end 1508 located away from the lower end 1506. The front snap-fit connector 1436 further includes a hook portion 1510 extending from the upper end 1508 of the stem portion 1504 to latch onto the frontwardly extending projection 1432.

Similarly, the second or rear front snap-fit connector 1438 includes an elongated stem portion 1604 which has a lower end 1606 extending from a rear end 1650 of the second panel 1422 and an upper end 1608 located away from the lower end 1606. The rear snap-fit connector 1438 further includes a hook portion 1610 extending from the upper end 1608 of the stem portion 1604 to latch onto the rearwardly extending projection 1434.

In the illustrated embodiment, the stem portions 1504, 1604 of the front and rear snap-fit connectors 1436, 1438 diverge away from each other and the hook portions 1510, 1610 are disposed towards each other such that they face each other. Alternatively, the gutter cover 1402 could be configured such that the stem portions 1504, 1604 of the front and rear snap-fit connectors 1436, 1438 extend towards each other and the hook portions 1510, 1610 face away from each other.

Still in the illustrated embodiment, the stem portion 1504, 1604 of each snap-fit connector 1436, 1438 is angled relative to the second panel 1422 at a first angle $\theta_1$ and the lower segment 1502, 1602 of each projection 1432, 1434 is generally angled away from the first panel 1420 at a second angle $\theta_2$ which is greater than the first angle $\theta_1$.

In this configuration, when the second sheet 1428 is fully engaged with the first sheet 1430, the first and second snap-fit connectors 1436, 1438 are maintained in an elastically-deformed state and are thus biased inwardly towards the frontwardly and rearwardly extending projections 1432, 1434, thereby ensuring a tight connection between the first and second sheets 1430, 1428. It will be further appreciated that in this configuration, the second sheet 1428 is not permanently secured to the first sheet 1430 and is therefore disengageable from the first sheet 1430.

In an alternative embodiment, instead of both being angled at the first angle $\theta_1$, the stem portion 1504, 1604 of the front and rear snap-fit connectors 1436, 1438 could be angled at different angles from each other. Similarly, instead of both being angled at the second angle $\theta_2$, the lower segments lower segment 1502, 1602 of the frontwardly and rearwardly extending projections 1432, 1434 could be angled at different angles from each other.

Figure 17:
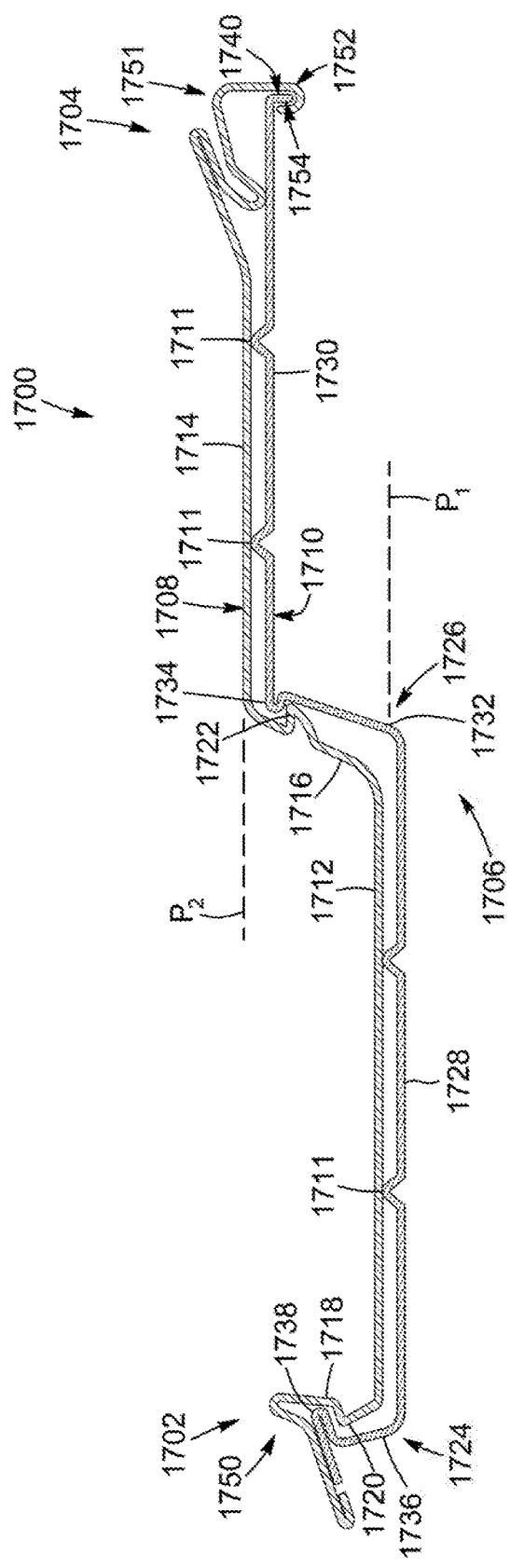
FIG. 17 is a schematic drawing of a cross-sectional view of a gutter cover, in accordance with yet another embodiment.

Turning now to FIG. 17, there is shown a gutter cover 1700, in accordance with an alternative embodiment. The gutter cover 1700 is configured to be used with a gutter such as the gutter 900.

Similarly to the gutter cover 1402, the gutter cover 1700 includes a front portion 1702, a rear portion 1704 and a central portion 1706 extending between the front portion 1702 and the rear portion 1704. Also similarly to the gutter cover 1402, the central portion 1706 includes spaced apart first and second panels 1708, 1710. The first panel 1708 has a first set of throughholes, not shown, and the second panel 1710 has a second set of throughholes, also not shown, which are generally offset from the first set of throughholes. More specifically, as with the first and second sets of throughholes 148, 152, the first and second sets of throughholes of the gutter cover 1700 can be offset according to various offset arrangements described herein, such as the arrangements described above and illustrated in FIGS. 3 to 8.

In the embodiment illustrated in FIG. 17, the second panel 1710 further includes a plurality of protrusions or bumps 1711 which extend from the second panel 1710 towards the first panel 1708. The bumps 1711 could be generally dome-shaped, be elongated to define ribs extending lengthwise or transversely relative to the gutter cover 1700 or have any other shape which a skilled person would consider to be suitable. The bumps 1711 are generally similar to the protrusions described hereinabove and define spacer members between the first and second panels 408, 410 to maintain the first and second panels 408, 410 spaced from each other. When the second panel 1710 is mounted to the first panel 1708 as shown in FIG. 17, the first panel 1708 abuts the bumps 1711 and is thereby maintained at a predetermined spacing distance from the second panel 1710. Alternatively, the bumps 1711 could instead be defined on the first panel 1708 and extend towards the second panel 1710. In this case, the second panel 1710 would abut the bumps 1711 to be maintained at the predetermined spacing distance from the first panel 1708. In yet another embodiment, the bumps 1711 could be defined on both the first and second panels 1708, 1710 and abut the opposite panel 1708, 1710.

In the embodiment illustrated in FIG. 17, the central portion 1706 of the gutter cover 1700 has a generally stepped profile. Specifically, the first panel 1708 includes a generally planar lower panel portion 1712, a generally planar upper panel portion 1714 and an intermediate wall 1716 extending between the lower and upper panel portions 1712, 1714. The lower panel portion 1712 extends along a first plane $P_1$ and the upper panel portion 1714 extends along a second plane P2 which is generally parallel to the first plane $P_1$ and spaced from the first plane $P_1$.

In the embodiment illustrated in FIG. 17, the lower panel portion 1712 is located towards the front portion 1702 of the gutter cover 1700 and the upper panel portion 1714 is located towards the rear portion 1704. Alternatively, the lower panel portion 1712 could instead be located towards the rear portion 1704 and the upper panel portion 1714 could instead be located towards the front portion 1702.

The first panel 1708 is defined in a first sheet of material and the second panel 1710 is defined in a second sheet of material which is distinct from the first sheet and which is engageable with the first sheet.

The front portion 1702 of the gutter cover 1700 further includes a gutter wall engaging section 1750, extending forwardly from the first sheet, configured for engaging a front wall of the gutter. In the embodiment illustrated in FIG. 17, the gutter wall engaging section 1750 is generally located slightly below the level of the upper panel portion 1714 and therefore generally above the second plane $P_1$ of the lower panel portion 1712. The first panel 1708 further includes a front wall 1718 which extends generally vertically between the lower panel portion 1712 and the gutter wall engaging section 1750.

In embodiment illustrated in FIG. 17, the first panel 1708 further includes frontwardly and rearwardly extending projections 1720, 1722 and the second panel 1710 includes first and second snap-fit connectors 1724, 1726 which are generally adapted to resiliently engage the frontwardly and rearwardly extending projections 1720, 1722.

Specifically, the frontwardly and rearwardly extending projections 1720, 1722 are generally similar to the frontwardly and rearwardly extending projections 1432, 1434 illustrated in FIGS. 14 to 16 and described above. In the embodiment illustrated in FIG. 17, the frontwardly extending projection 1720 extends generally frontwardly from the front wall 1718 and the rearwardly extending projection 1722 extends generally rearwardly from the intermediate wall 1716 of the first panel 1708.

In an embodiment, the snap-fit connectors 1436, 1438, such as the projections 1432, 1434, or the second snap-fit connectors 1724, 1726, such as the projections 1718, 1722, can extend continuously along the gutter cover 102 in the lengthwise direction 192. In an alternative embodiment, they can include a plurality of spaced-apart discontinuous projections defining together a snap-fit connector. For instance, they could be defined by a plurality of spaced-apart hooks formed by crimping the sheet; the hooks protruding outwardly, either forwardly or rearwardly as shown in the figures.

Still in the embodiment illustrated in FIG. 17, the second panel 1710 generally has the same profile as the first panel 1708. Specifically, the second panel 1710 includes a lower panel portion 1728 which extends generally along the lower panel portion 1712 of the first panel 1708 and an upper panel portion 1730 which extends generally along the upper panel portion 1714 of the first panel 1708. The first snap-fit connector 1724 further extends between the lower and upper panel portions 1728, 1730 and along the intermediate wall 1716 of the first panel 1708, while the second snap-fit connector 1726 extends generally along the intermediate wall 1716 of the first panel 1708.

More specifically, the first snap fit connector 1724 is located towards the front portion 1702 of the gutter cover 1700 and includes an elongated stem portion 1736 which extends from the lower panel portion 1728 and a hook portion 1738 extending from the elongated stem 1736 and projecting towards the rear portion 1704 of the gutter cover 1700. The second snap-fit connector 1726 also includes an elongated stem portion 1732 which extends from the lower panel portion 1728 and meets the upper panel portion 1730 to define a hook portion 1734 which projects frontwardly towards the front portion 1702 of the gutter cover 1700.

In this configuration, the first and second snap-fit connectors 1724, 1726 of the second panel 1710 may therefore be aligned and engaged with the frontwardly and rearwardly extending projections 1720, 1722 of the first panel 1708 in a resilient, snap-fit engagement such that the second panel 1710 is maintained generally parallel to the first panel 1708.

In the illustrated embodiment, the upper panel portion 1730 of the second panel 1710 further includes a rear hook portion 1740 extending rearwardly from the first sheet, located towards the rear portion 1704 and the first panel 1708 includes a rear receiving portion 1751 configured to receive the rear hook portion 1740 and thereby attach the second panel 1710 to the first panel 1708. More specifically, the rear hook portion 1740 extends generally downwardly from the upper panel portion 1730 and the rear receiving portion 1751 includes a U-shaped lower end 1752 defining a receiving recess 1754 which faces upwardly to receive the rear hook portion 1740.

In one embodiment, the rear hook portion 1740 may be inserted into the rear receiving portion 1751 by first positioning the second panel 1710 at an angle relative to the first panel 1708 and inserting the free end of the rear hook portion 1740 into the receiving recess 1754. The second panel 1710 may then be pivoted towards the first panel 1708 until the second panel 1710 abuts the first panel 1708 to thereby further insert the rest of the rear hook portion 1740 into the receiving recess 1754.

Alternatively, the upper panel portion 1730 of the second panel 1710 could instead include a third snap-fit connector configured to engage another rearwardly extending projection of the first panel 408 located near the rear portion 1704 of the gutter cover 1700.

Turning now to FIGS. 18A and 18B, there is shown a gutter cover 1800, in accordance with yet another embodiment. The gutter cover 1800 is generally similar to the gutter cover gutter cover 1402 illustrated in FIGS. 14 to 16. Specifically, the gutter cover 1800 includes a front portion 1802, a rear portion 1804 and a central portion 1806 extending between the front portion 1802 and the rear portion 1804. The gutter cover 1800 is further made of a first sheet 1808 superposed over a second sheet 1810. The central portion 1806 of the first and second sheets 1808, 1810 respectively include spaced-apart first and second panels 1812, 1814. In the embodiment illustrated in FIGS. 5A and 5B, the central portion 506 is generally convexly curved but, alternatively, could instead be generally planar.

First and second sets of offset throughholes, not shown, are further defined respectively in the first and second panels 1812, 1814. As with the first and second sets of throughholes 148, 152, the first and second sets of throughholes of the gutter cover 1800 can be offset according to various offset arrangements described herein, such as the arrangements described above and illustrated in FIGS. 3 to 8.

Still similarly to the gutter cover 1402 illustrated in FIGS. 14 to 16, the second sheet 1810 is removably attached to the first sheet 1808. Specifically, the second sheet 1810 includes a generally V-shaped rear connector 1818 which extends outwardly from a rear end of the second panel 1814. The rear connector 1818 includes a first planar segment 1820 and a second planar segment 1822 which is angled relative to the first planar segment 1820 to define an elbow 1824 between the first and second planar segments 1820, 1822. As shown in FIG. 18A, when the second sheet 1810 is attached to the first sheet 1808, the elbow 1824 points generally upwardly.

The first sheet 1808 includes a channel 1826 located generally towards the rear of the first panel 1812 to receive the rear connector 1818 of the second sheet 1810. The channel 1826 includes a sidewall which is defined by a projection 1828 which extends generally downwardly from the first sheet 1808 and a hook-shaped member 1830 which extends rearwardly from the projection 1828. In the embodiment illustrated in FIGS. 18A and 18B, the projection 1828 and the hook-shaped member 1830 are formed from folds in the first sheet 1808.

The channel 1826 further includes an opening 1832 which faces generally downwardly and which has a width which is smaller than the width of the rear connector 1818.

In one embodiment, the rear connector 1818 may be inserted in the channel 1826 by first positioning the second sheet 1810 at an angle relative to the first sheet 1808 and inserting the free end of the second planar segment 1822 into the channel 1826. The second sheet 1810 may then be pivoted towards the first sheet 1808 until the second panel 1814 abuts the first panel 1812 to thereby further insert the rest of the second planar segment 1822 and the first planar segment 1820 into the channel 1826.

Alternatively, the rear connector 1818 may be resiliently deformable to form a snap-fit connection with the first sheet 1808. Specifically, the first and second planar segments 1820, 1822 may be resiliently movable towards each other to allow the rear connector 1818 to be inserted through the opening 1832 and into the channel 1826. In this embodiment, the elbow 1824 is first inserted through the opening 1832, and the first and second planar segments 1820, 1822 are urged towards each other as they move through the opening 1832. Once past the opening 1832 and inside the channel 1826, the rear connector 1818 is urged back to its original shape and width and is thereby prevented from being pulled out of the channel 1826 through the opening 1832.

Still referring to FIGS. 18A and 18B, the second sheet 1810 includes a front connector 1834 having a stem portion 1836 extending generally upwardly from a front end of the first panel 1812 and a generally horizontal portion 1838 extending frontwardly from the stem portion 1836. The stem portion 1836 is angled rearwardly towards the rear of the second panel 1814. In this configuration, the stem portion 1836 is angled at an acute angle relative to the second panel 1814.

Similarly, the first sheet 1808 also includes a front connector 1840 having a stem portion 1842 extending generally upwardly from a front end of the first panel 1812 and a generally horizontal portion 1844 extending frontwardly from the stem portion 1842. The stem portion 1842 is further angled rearwardly towards the rear of the second panel 1814. In this configuration, the stem portion 1842 is angled at an acute angle relative to the first panel 1812.

As illustrated in FIG. 18A, the stem portion 1836 of the second sheet front connector 1834 is at least partially juxtaposed against the stem portion 1842 of the first sheet front connector 1840 when the first and second sheets 1808, 1810 are connected together. In this configuration, since both the stem portion 1842 of the first sheet 1808 and the stem portion 1836 of the second sheet 1810 are angled at an acute angle relative to the first and second panels 1812, 1814, the stem portions 1836, 1842 abut against each other such that the second panel 1814 is prevented from moving downwardly away from the first panel 1812.

Now referring to FIG. 19, the front connector 1840 of the first sheet 1808 may further include an end portion 1900 which extends away from the horizontal portion 1844 and, more particularly, which is angled downwardly relative to the horizontal portion 1844, thereby forming a hook portion 1902 at the front end the horizontal portion 1844. In one embodiment, the end portion 1900 is angled at an angle of about 45 degrees relative to the horizontal portion 1844. Alternatively, the end portion 1900 may be angled relative to the horizontal portion 1844 at an acute angle which is different than 45 degrees.

In this embodiment, a front end 1904 of the horizontal portion 1838 of the second sheet front connector 1834 may be received within the hook portion 1902 of the first sheet front connector 1840 when the second sheet 1810 is attached the first sheet 1808 to further prevent the second panel 1814 from moving downwardly relative to the first panel 1812 and therefore maintain the second sheet 1810 attached to the first sheet 1808.

Alternatively, the front connector 1840 of the first sheet 1808 may not include a hook portion. Referring to FIG. 20, the front connector 1840 may instead include a frontwardly extending projection 2000 which extends from the stem portion 1842. In this embodiment, the front connector 1834 of the second sheet 1810 may include a bump portion 2002 which extends rearwardly from the front connector stem portion 1836. In this embodiment, the stem portion 1836 of the second sheet front connector 1834 is resiliently deformable away from the stem portion 1842 of the first sheet front connector 1840 such that the bump portion 2002 may engage the frontwardly extending projection 2000 of the first sheet front connector 1840 in a resilient, snap-fit engagement as the front connectors 1840, 1834 of the first and second sheets 1808, 1810 are engaged together to attach the second panel 1814 to the first panel 1812.

It will be appreciated that the arrangements described above are merely provided as examples, and that many alternative configurations may be considered. For example, in one embodiment, there could be provided a gutter cover having spaced-apart first and second panels in which the first panel includes two projections which extend inwardly instead of outwardly, and in which the second panel includes front and rear snap-fit connectors which are resiliently deformable towards each other, instead of away from each other, to engage the two projections. In yet another embodiment, the snap-fit connectors could be provided on the first panel instead of the second panel, and the projections could extend from the second panel instead of from the first panel.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A gutter cover for covering an opening of a gutter having a front wall, a rear wall and a bottom wall defining a gutter channel, the gutter cover comprising:
   a front portion operatively engageable with the front wall of the gutter;
   a rear portion operatively engageable with the rear wall of the gutter;
   a central portion extending between the front portion and the rear portion and having a first panel and a second panel, the first panel extending above and spaced apart from the second panel to define a space therebetween, the first and second panels extending parallel to each other such that the space has a constant thickness from the front portion to the rear portion, the first panel having a first set of throughholes and the second panel having a second set of throughholes being at least partially offset from the first set of throughholes.

2. The gutter cover as claimed in claim 1, wherein the first set of throughholes are offset from the second set of throughholes in a widthwise direction of the central portion.

3. The gutter cover as claimed in claim 1, wherein the first set of throughholes are offset from the second set of throughholes in a lengthwise direction of the central portion.

4. The gutter cover as claimed in claim 1, wherein the first set of throughholes and the second set of throughholes are partially overlapping in a direction perpendicular to the first and second panels.

5. The gutter cover as claimed in claim 1, wherein at least one of the first and second set of throughholes are circular.

6. The gutter cover as claimed in claim 1, wherein one of the first and second set of throughholes are circular and the other one of the first and second set of throughholes are elongated.

7. The gutter cover as claimed in claim 1, further comprising at least one spacer member extending between the first panel and the second panel.

8. The gutter cover as claimed in claim 7, wherein the at least one spacer member includes a plurality of protrusions extending from at least one of the first and second panels towards the other one of the first and second panels.

9. The gutter cover as claimed in claim 1, further comprising a first sheet comprising the first panel and a second sheet comprising the second panel.

10. The gutter cover as claimed in claim 9, wherein at least of the first and second sheets is made of a perforated non-mesh material.

11. The gutter cover as claimed in claim 10, wherein the first and second sheets are both made of a perforated non-mesh material.

12. The gutter cover as claimed in claim 9, wherein one of the first and second sheets comprises at least one snap-fit connector configured for resiliently engaging the other one of the first and second sheets to mount the second sheet to the first sheet.

13. The gutter cover as claimed in claim 1, wherein a surface area covered by the second set of throughholes is above a surface area covered by the first set of throughholes.

14. A gutter assembly comprising:
a gutter having a front wall, a rear wall and a bottom wall defining a gutter channel having an open top; and
a gutter cover for covering the open top of the gutter, the gutter cover including:
   a front portion operatively engageable with the front wall of the gutter;
   a rear portion operatively engageable with the rear wall of the gutter; and
   a central portion extending between the front portion and the rear portion and having a first panel and a second panel, the first panel extending above and spaced apart from the second panel to define a space therebetween, the first and second panels extending parallel to each other such that the space has a constant thickness from the front portion to the rear portion, the first panel having a first set of throughholes and the second panel having a second set of throughholes being at least partially offset from the first set of throughholes.

15. A gutter cover for covering an opening of a gutter having a front wall, a rear wall and a bottom wall defining a gutter channel, the gutter cover comprising:
a front portion operatively engageable with the front wall of the gutter;
a rear portion operatively engageable with the rear wall of the gutter;
a central portion extending between the front portion and the rear portion and having a first panel and a second panel, the first panel extending above and spaced apart from the second panel, the first panel having a first set of throughholes and the second panel having a second set of throughholes being at least partially offset from the first set of throughholes,
wherein the gutter cover further comprises a first sheet comprising the first panel and a second sheet comprising the second panel, one of the first and second sheets comprising at least one snap-fit connector configured for resiliently engaging the other one of the first and second sheets to mount the second sheet to the first sheet.

16. The gutter cover as claimed in claim 15, wherein the first sheet comprises at least one projection extending outwardly away from the first panel and the second sheet comprises the at least one snap-fit connector engageable with a corresponding one of the at least one projection.

17. The gutter cover as claimed in claim 16, wherein the at least one projection comprises frontwardly and rearwardly extending projections and the at least one snap-fit connector comprises first and second snap-fit connectors configured for engaging the frontwardly and rearwardly extending projections.

18. The gutter cover as claimed in claim 17, wherein the first and second snap-fit connectors are resiliently deformable outwardly away from each other to engage the frontwardly and rearwardly extending projections.

19. The gutter cover as claimed in claim 18, wherein each snap-fit connector includes an elongated stem portion extending from the second panel of the second sheet and a hook portion extending from the elongated stem, the stem portions of the first and second snap-fit connectors diverging away from each other and the hook portions being folded towards each other.

20. The gutter cover as claimed in claim 19, wherein each stem portion is angled relative to the second panel at a first angle.

21. The gutter cover as claimed in claim 20, wherein the frontwardly and rearwardly extending projections extend away from each other and each one of the frontwardly and rearwardly extending projections is angled relative to the first panel at a second angle greater than the first angle.

\* \* \* \* \*